United States Patent
Uchikawa

(10) Patent No.: US 9,667,101 B2
(45) Date of Patent: May 30, 2017

(54) POWER SUPPLY SYSTEM, CONTROL METHOD THEREOF, AND RECORDING MEDIUM

(71) Applicant: NEC Platforms, Ltd., Kanagawa (JP)

(72) Inventor: Takafumi Uchikawa, Kanagawa (JP)

(73) Assignee: NEC PLATFORMS, LTD., Kanagawa (JP)

( * ) Notice: Subject to any disclaimer, the term of this patent is extended or adjusted under 35 U.S.C. 154(b) by 394 days.

(21) Appl. No.: 14/341,861

(22) Filed: Jul. 28, 2014

(65) Prior Publication Data
US 2015/0039152 A1 Feb. 5, 2015

(51) Int. Cl.
G06F 19/00 (2011.01)
H02J 13/00 (2006.01)

(52) U.S. Cl.
CPC ............................... *H02J 13/0096* (2013.01)

(58) Field of Classification Search
CPC ............ G06F 1/3296; G06F 1/26; H02J 1/10
See application file for complete search history.

(56) References Cited

U.S. PATENT DOCUMENTS

| | | | | |
|---|---|---|---|---|
| 7,739,522 B2 * | 6/2010 | Festo | ................... | H03F 1/0205 330/199 |
| 8,456,149 B2 * | 6/2013 | Tokunaga | ............ | G01R 21/133 324/76.11 |
| 2006/0005055 A1 * | 1/2006 | Potega | .................. | G06F 1/1632 713/300 |
| 2009/0271642 A1 * | 10/2009 | Cheng | .................... | G06F 1/263 713/300 |
| 2010/0280774 A1 * | 11/2010 | Ewing | ..................... | H04Q 9/00 702/60 |
| 2010/0281281 A1 * | 11/2010 | Humphrey | ............ | G06F 1/3203 713/323 |
| 2012/0021704 A1 * | 1/2012 | Chan | .................... | H03G 3/3042 455/95 |

(Continued)

FOREIGN PATENT DOCUMENTS

| | | |
|---|---|---|
| JP | 05-91660 | 4/1993 |
| JP | 2009-140138 | 6/2009 |

(Continued)

OTHER PUBLICATIONS

Japanese Official Action—2013-157292—Mar. 7, 2017.

*Primary Examiner* — Michael D Masinick
(74) *Attorney, Agent, or Firm* — Young & Thompson

(57) ABSTRACT

A power supply system controls output powers of a plurality of power supply apparatus for realizing optimal conversion efficiency between input power and output power. The power supply system includes a plurality of power conversion units that convert an input power supplied from the input side into an output power for supplying the output power to a load connected to the output side; a power measurement unit that measures the output power of the power conversion unit; and a power supply control unit that calculates the input power to the power conversion unit in response to the output power of the power conversion units measured by the power measurement unit, and calculates the output power of the power conversion unit realizing the minimum calculated input power as an optimal output power, and controls the power conversion units based on the calculated optimal output power.

7 Claims, 12 Drawing Sheets

(56) References Cited

U.S. PATENT DOCUMENTS

| | | | |
|---|---|---|---|
| 2012/0066519 A1* | 3/2012 | El-Essawy | H05K 7/1492 |
| | | | 713/300 |
| 2012/0176114 A1 | 7/2012 | Yamadaya | |
| 2012/0216055 A1* | 8/2012 | Dumas | G06F 1/26 |
| | | | 713/320 |
| 2013/0085623 A1 | 4/2013 | Izumisawa et al. | |
| 2013/0342178 A1* | 12/2013 | Wang | G05F 1/66 |
| | | | 323/234 |
| 2015/0039152 A1* | 2/2015 | Uchikawa | H02J 13/0096 |
| | | | 700/297 |
| 2015/0057827 A1* | 2/2015 | Uchikawa | G05F 1/66 |
| | | | 700/297 |
| 2016/0239079 A1* | 8/2016 | Yuasa | G06F 1/3296 |

FOREIGN PATENT DOCUMENTS

| | | |
|---|---|---|
| JP | 2009-159691 | 7/2009 |
| JP | 2009-254082 | 10/2009 |
| JP | 2011-022022 | 2/2011 |
| JP | 2011-91968 | 5/2011 |
| JP | 2012-244862 | 12/2012 |
| JP | 2013-504986 | 2/2013 |
| JP | 2013-74638 | 4/2013 |
| WO | 2013/046894 | 4/2013 |

\* cited by examiner

Fig. 1

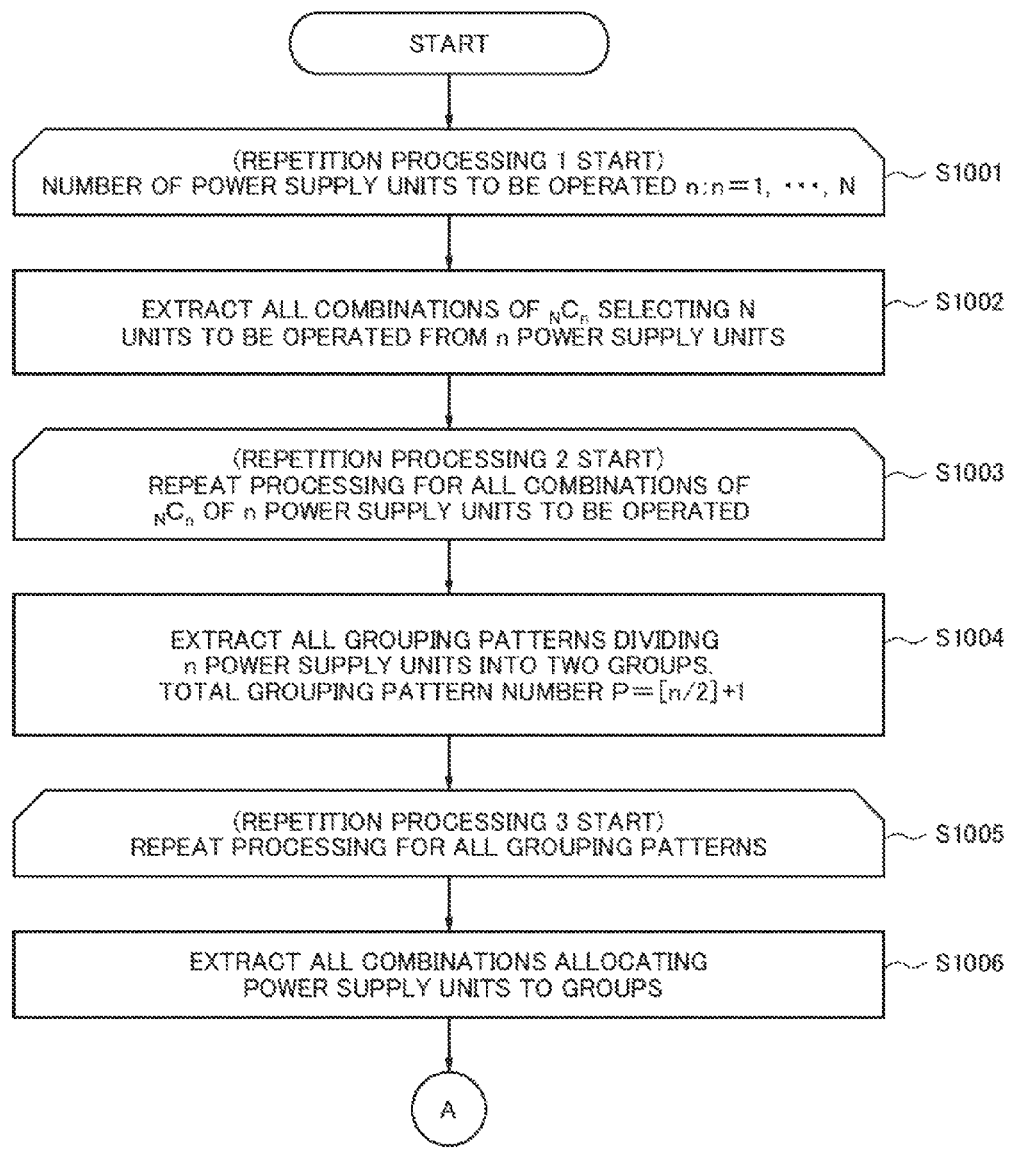

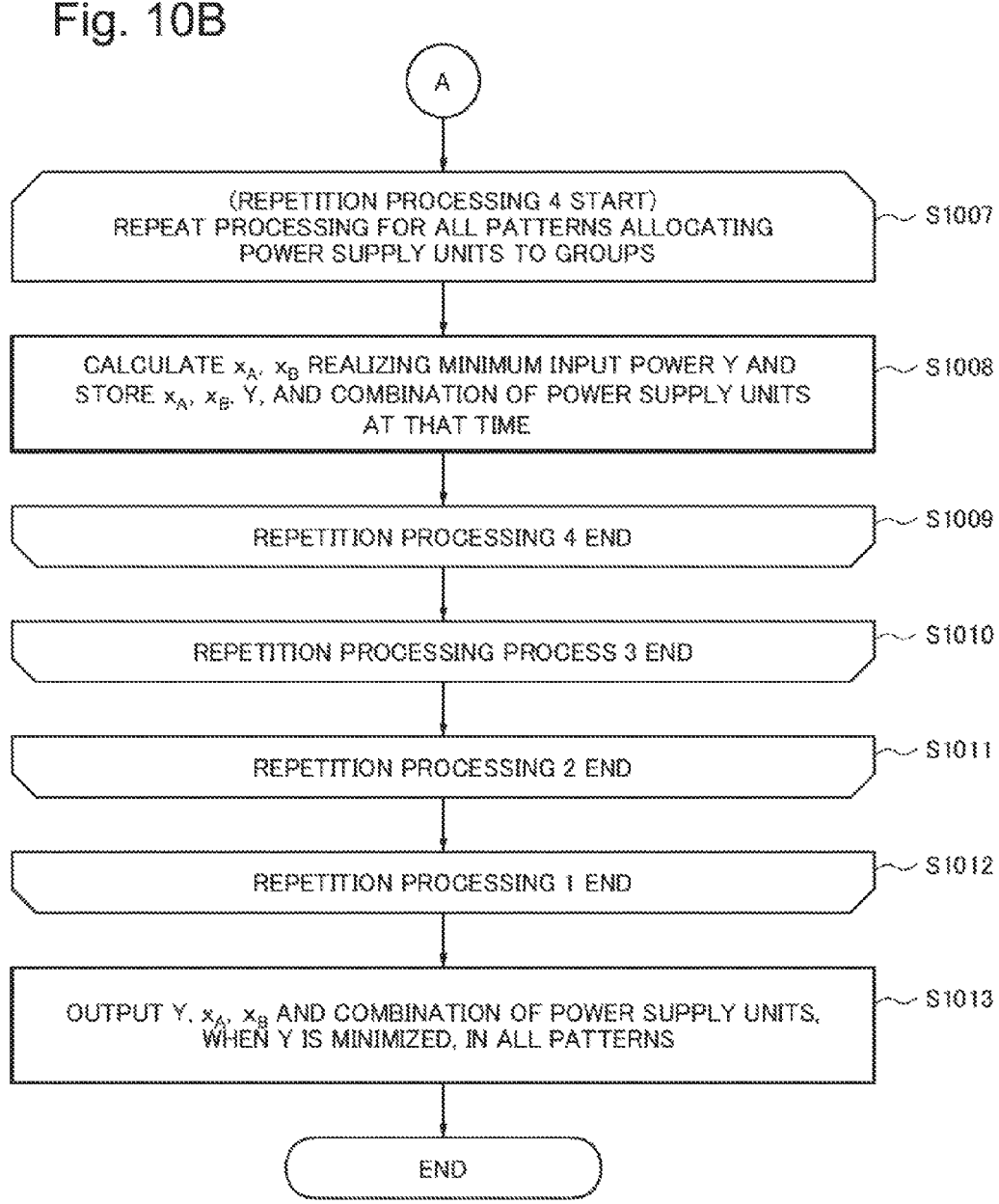

POWER SUPPLY SYSTEM, CONTROL METHOD THEREOF, AND RECORDING MEDIUM

This application is based upon and claims the benefit of priority from Japanese Patent Application No. 2013-157292, filed on Jul. 30, 2013, the disclosure of which is incorporated herein in its entirety by reference.

TECHNICAL FIELD

The present invention relates to a power supply system. In particular, the present invention relates to a power supply system including a plurality of power supply units, and a technique of a control method and the like for the power supply system.

BACKGROUND ART

In recent years, from interest in energy conservation, the reduction of power consumption in a variety of devices and efficiency enhancement of a power supply system are being promoted. Also for a power supply apparatus such as an AC/DC conversion apparatus mounted in a variety of devices, efficiency enhancement of power conversion is requested. In a general power supply apparatus, efficiency characteristics of power conversion tend to vary with an output power (a magnitude of a load). In a low load range where an output power of the power supply apparatus is small, consumption of power necessary to drive the power supply apparatus itself appears as a lowering factor (a loss) of power conversion efficiency. On the other hand, in a high load range where an output power of the power supply apparatus is large, output current increases and therefore, a loss due to impedance in the circuit, iron loss, copper loss, and the like appear as lowering factors of power conversion efficiency. In response to such power consumption variations, enhancement of power conversion efficiency of the entire power supply system is requested. There is known a technique for changing the number of power supply apparatus to be operated or a technique for switching over power conversion apparatus of different types to be operated in a high load range and in a low load range of the power supply apparatus in order to enhance power conversion efficiency.

Related arts existing prior to the present application include, for example, the following patent literature.

Patent literature 1 (Japanese Translation of PCT International Application Publication No. 2013-504986) discloses a technique such that in a power supply system configured to connect a plurality of power supply apparatuses in parallel to a load, the number of power supply apparatuses to be operated is changed on the basis of power consumption consumed at a load. The technique disclosed in the patent literature 1 prevents lowering of power conversion efficiency of the entire power supply system by the above technique.

Patent literature 3 (Japanese Laid-open Patent Publication No. 2009-254082) discloses a technique such that in a power supply system configured to make a power supply apparatus redundant, a combination of power supply apparatus for supplying power to a load is selected, based on power conversion efficiency of each of the power supply apparatus, and power consumption at the load.

Patent literature 4 (Japanese Laid-open Patent Publication No. 1993(H05)-091660) discloses a technique such that in a power supply system configured to connect a plurality of power supply apparatuses to a load, one power supply apparatus whose power conversion efficiency is highest is selected on the basis of power consumption at a load.

Power conversion efficiency is expressed as a ratio between input power and output power. The applicant of the present application has proposed a method of calculating an input power with use of a measurement result of output power, which is easily measurable, in patent literature 2 (Japanese Laid-open Patent Publication No. 2011-022022).

SUMMARY

Technical Problem

The power supply system disclosed in the aforementioned related art is configured such that a plurality of prepared power supply apparatus to be operated is switched over for an operation. In the power supply system having the above configuration, it is preferred to balance appropriately between input power and output power by adjusting an output power of individual power supply apparatus in the aspect of optimizing power conversion efficiency between the input power and the output power.

In view of the above, one of a main object of the present invention is to provide a power supply control system and the like for adjusting an output power of each power supply apparatus to realize optimal power conversion efficiency on the basis of power consumption at a load, when connecting a plurality of power supply sources as one power supply system.

Solution to Problem

In order to achieve the above object, a power supply system according to an aspect of the present invention includes the following configuration. Specifically, a power supply system according to an aspect of the present invention includes a plurality of power supply units that convert an input power into an output power and supply the output power to a load; a power measurement unit, which is connected between an output side of the power supply units and the load, that measures the output power output from the power supply units; and a power supply control unit that calculates an optimal output power realizing a minimum input power to the power supply units in accordance with the output power measured by the power measurement unit, and controls the power supply units based on the calculated optimal output power.

A control method for a power supply system according to an aspect of the present invention includes the following configuration. Specifically, a control method for a power supply system according to an aspect of the present invention measures output powers output from a plurality of power supply units that convert an input power into the output powers and supply the output powers to a load; calculates an optimal output power for the power supply units realizing a minimum input power to the power supply units in response to the measured output powers; and controls the power supply units based on the calculated optimal output power.

A non-transitory computer-readable storage medium (recording medium) according to an aspect of the present invention includes the following configuration. Specifically, a non-transitory computer-readable storage medium according to an aspect of the present invention provides a computer-readable storage medium recorded with a program, which is a control program controlling an operation of a power supply system, the program causing a computer to execute: a process of acquiring a measurement result of output powers output from a plurality of power supply units; a process of calculating an optimal output power realizing a minimum input power to be input to the power supply unit in response to the measurement result of output powers; and a process of controlling the output powers of the power supply units based on the calculated optimal output power.

Advantageous Effects of Invention

According to the present invention, output powers of a plurality of power supply sources are adjusted to realize optimal power conversion efficiency as a power supply system in response to power consumption consumed at a load.

BRIEF DESCRIPTION OF THE DRAWINGS

Exemplary features and advantages of the present invention will become apparent from the following detailed description when taken with the accompanying drawings in which:

FIG. 1 is a diagram illustrating a configuration of a power supply system in a first exemplary embodiment of the present invention;

FIG. 10A is a first half of a flowchart illustrating a process of calculating an optimal output power of each of the power supply units in the power supply system in the fourth exemplary embodiment of the present invention;

FIG. 10B is a second half of the flowchart illustrating the process of calculating an optimal output power of each of the power supply units in the power supply system in the fourth exemplary embodiment of the present invention.

EXEMPLARY EMBODIMENT

Figure 2:
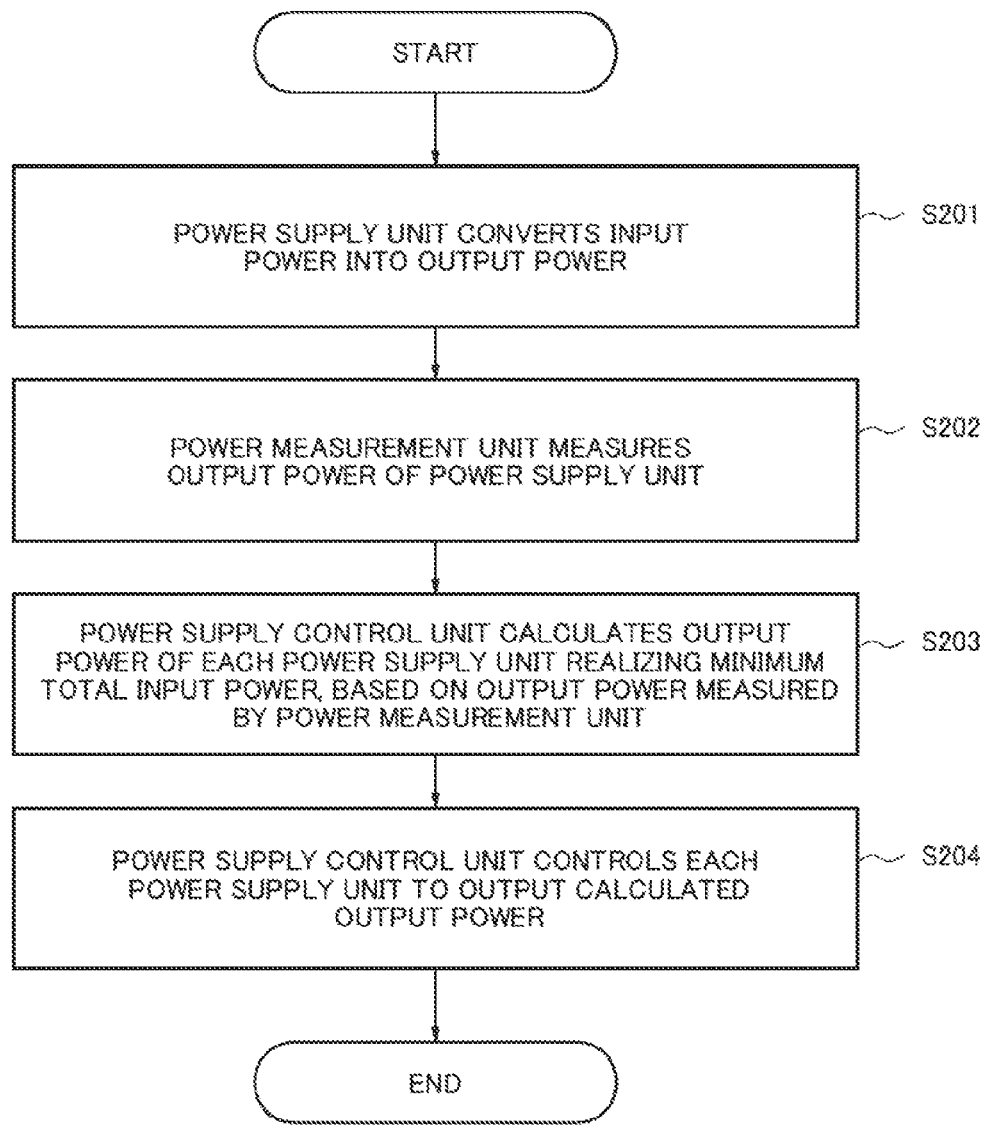
FIG. 2 is a flowchart illustrating an operation to be performed by the power supply system in the first exemplary embodiment of the present invention.

Next, exemplary embodiments of the present invention are described in details with referring to the drawings.
<First Exemplary Embodiment>

Figure 1:
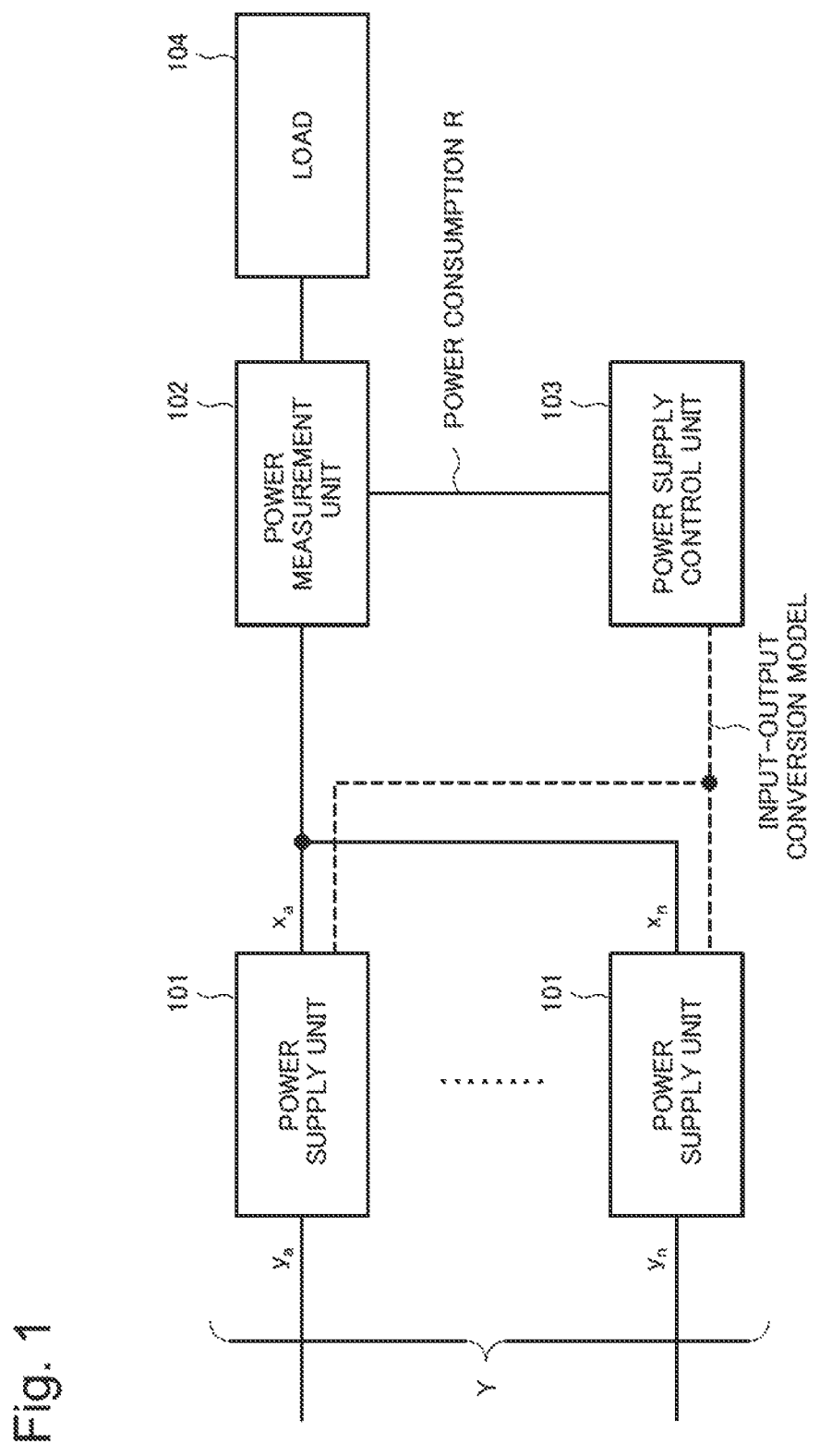

A power supply system in the first exemplary embodiment of the present invention is described with referring to FIG. 1 and FIG. 2. FIG. 1 is a diagram illustrating a configuration of the power supply system in the first exemplary embodiment of the present invention. As illustrated in FIG. 1, the power supply system in the first exemplary embodiment of the present invention includes a plurality of power supply units 101, a power measurement unit 102, and a power supply control unit 103. The outputs of a plurality of the power supply units 101 are integrated, and the integrated output is supplied to a load 104.

The each power supply unit 101 converts an input power, which is input from the outside, into a form appropriate to the load 104, and the converted input power is supplied to the load as an output power. The power supply unit 101 may be a single power conversion circuit. Alternatively, the power supply unit may be a power conversion apparatus which may handle a control protocol such as PMBus (Power Management Bus). As an input power to the power supply unit 101, arbitrary power source such as commercial AC power or UPS (Uninterruptible Power Supply) may be applied. An input-output conversion model which represents a conversion relationship between input power and output power is set in each of the power supply units 101.

A setting area in which the input-output conversion model is set may be determined arbitrarily according to the specification or configuration of each of the power supply units 101. For example, a non-volatile memory such as a flash memory may be mounted in each of the power supply units 101, and the input-output conversion model may be stored in the memory area with use of an appropriate tool at the time of manufacturing before shipment or at the time of maintenance after shipment or the like. The details of the input-output conversion model will be descried later.

The power measurement unit 102 is connected to the output side of a plurality of the power supply units 101 for measuring the sum of output powers of the power supply units 101. Regarding the power measurement method of the power measurement unit 102, the same or similar method as for a general power meter may be applied. Thus, the description relating to the power measurement method is omitted.

The power supply control unit 103 adjusts the output power of each of the power supply units 101 to realize maximum power conversion efficiency of the entire power supply system according to the output power measured by the power measurement unit 102. The power supply control unit 103 may be constituted of dedicated hardware device. Alternatively, the power supply control unit 103 may be constituted of hardware such as a general-purpose CPU (Central Processing Unit) and a memory (both of which are not illustrated), and various software programs to be executed by the CPU.

The power supply control unit 103 and each of the power supply units 101 are communicatively connected to each other so as to transmit and receive an input-output conversion model of each of the power supply units 101 and various control signals. The power supply control unit 103 and the power measurement unit 102 are communicatively connected to each other so as to transmit and receive measurement data by the power measurement unit 102 and various control signals. As a communication path for these connections, arbitrary communication path (communication line) such as I2C (Inter-Integrated Circuit) or SMBus (System Management Bus) may be used. As a communication protocol, arbitrary protocol, such as PMBus protocol, may be used. The communication path and the protocol may be selected appropriately according to the configuration of the power supply system. It is not always necessary to adopt the aforementioned specific examples as the communication path and the protocol.

The power supply units 101, the power measurement unit 102, and the power supply control unit 103 may be configured as hardware independent of each other. The power supply units 101, the power measurement unit 102, and the power supply control unit 103 may be configured as partly or entirely integrated hardware. The power supply units 101, the power measurement unit 102, and the power supply control unit 103 may be configured to be provided as software program such that a part of the functions thereof is executed by the hardware.

Next, an operation by the power supply system according to the present embodiment is described with referring to FIG. 2. FIG. 2 is a flowchart illustrating an operation by the power supply system in the first exemplary embodiment of the present invention.

First of all, a plurality of the power supply units 101 output output powers $x_a$ to $x_n$ by converting the power input, from the outside, into an appropriate form according to the load 104 (in Step S201). The conversion processing to be performed by the power supply unit 101 may be arbitrary conversion processing, such as voltage conversion or AC/DC conversion, according to a load to be connected. In the embodiment, an input-output conversion model obtained by modeling a conversion between input power and output power is set in each of the power supply units 101. Assuming that $y_i$ indicates an input power, and $x_i$ indicates an output power of the i-th power supply unit, the conversion model of input power and output power in the embodiment can be expressed by the following Eq. (1).

$$y_i = f_i(x_i) \qquad (1)$$

As expressed by Eq. (1), the input-output conversion model in the present embodiment may be configured such that an input power is derivable from an output power. An appropriate model may be selected according to the specification of each of the power supply units, as the input-output conversion model. For example, a function, by which a conversion relationship between input power $y_i$ and output power $x_i$ of each of the power supply units is determined, may be selected as the input-output conversion model $f_i$. A conversion table relating to output power $x_i$ and input power $y_i$ may be selected as the input-output conversion model $f_i$.

Next, the power measurement unit 102 measures power consumption R at the load 104 (in Step S202). Output powers of the power supply units 101 are integrated at the connection point on the output side. Thus, power consumption R at the load 104 is expressed by the following Eq. (2), as the sum of output powers of respective power supply units.

$$R = X - \sum_{i=a}^{n} x_i \qquad (2)$$

Next, the power supply control unit 103 calculates an output power of each of the power supply units 101 realizing minimum total input power Y with respect to the power supply system according to the present embodiment in response to power consumption R measured by the power measurement unit 102 (in Step S203). In the following, the contents of processing in the present step are described.

Assuming that input powers to be input to respective power supply units 101 are $y_a$ to $y_n$, total input power Y to the power supply system is expressed by the following Eq. (3).

$$Y = \sum_{i=a}^{n} y_i \qquad (3)$$

The power supply control unit 103 calculates a total input power from power consumption measured by the power measurement unit 102, with referring to the input-output conversion model set in each of the power supply units 101. Total input power Y with respect to the power supply system in the embodiment is expressed by the following Eq. (4) from Eqs. (1) and (3), with use of the input-output conversion models.

$$Y = \sum_{i=a}^{n} y_i = \sum_{i=a}^{n} f_i(x_i) \qquad (4)$$

Power conversion efficiency of the entire power supply system according to the present embodiment is calculated as the ratio (X/Y) between input power Y and output power X. When input power is smallest in relation to output power X, the power conversion efficiency is maximum.

Thus, the power supply control unit 103 calculates an optimal output power of each of the power supply units 101 realizing minimum input power Y as expressed by Eq. (4), with use of Eq. (2) as a condition. The specific method for calculating an optimal output power with respect to each of the power supply units 101 depends on the form of the input-output conversion model as expressed by Eq. (1).

For example, it is assumed that the input-output conversion model is a function, which defines a conversion relationship between input power and output power. In this case, a mathematical optimal solution realizing a minimum input power as expressed by Eq. (4) may be derived as an optimal output power with respect to each of the power supply units 101. The power supply control unit 103 may obtain an approximation solution for the optimal solution by numeric calculation or the like.

Next, the power supply control unit 103 controls the output power of each of the power supply units 101 so as to output the optimal output power obtained in Step S203 (in Step S204). The power supply control unit 103 may select a method appropriate for the specification or the configuration of each of the power supply units 101, such as output voltage control or output current control, as a method for controlling the output power of each of the power supply units 101. For example, when each of the power supply units 101 is a switching AC/DC converter, the power supply control unit 103 may control the output voltage of each of the power supply units 101.

According to the power supply system of the present embodiment as described above, output powers of a plurality of the power supply units 101 are adjusted to realize optimal power conversion efficiency for the entire power supply system in response to power consumption consumed at the load 104.

In the embodiment, the power supply control unit 103 calculates an input power to each of the power supply units 101 in response to power consumption measured by the power measurement unit 102, based on the input-output conversion model set in each of the power supply units 101. Then, the power supply control unit 103 controls the output power of each of the power supply units 101 to minimize the calculated input power.

As a result of the above control procedure, an input power in relation to an output power is minimized. Thus, according to the exemplary embodiment, it is possible to obtain a power supply system which is operated with optimal power conversion efficiency in response to power consumption consumed at the load 104.

<Second Exemplary Embodiment>

Next, the second exemplary embodiment of the present invention is described.

In the following description, a characteristic configuration according to the present embodiment is mainly described. The elements in the second exemplary embodiment substantially identical or equivalent to those in the first exemplary embodiment are indicated with the same reference numerals, and repeated description thereof is omitted.

Figure 3:
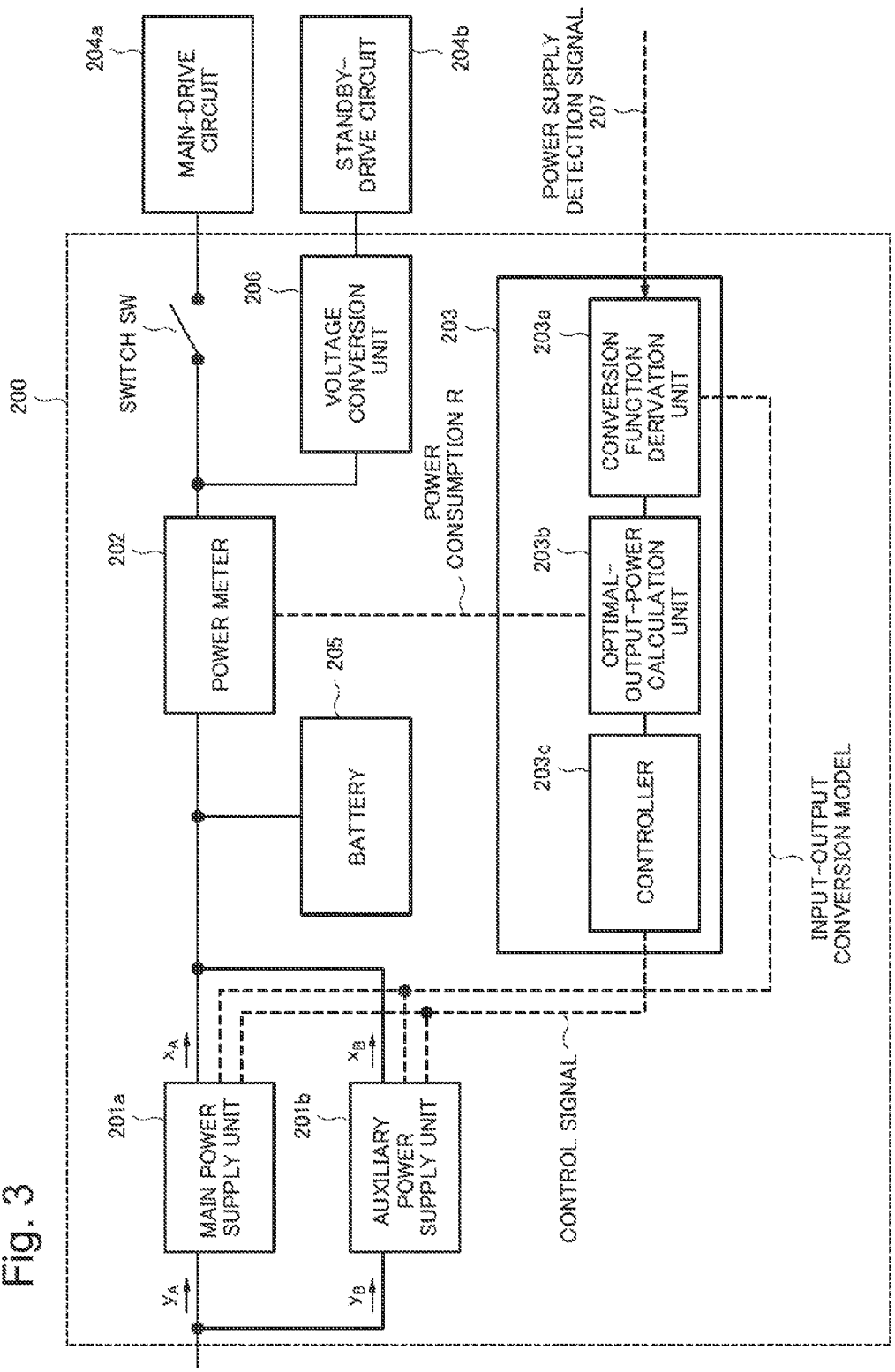
FIG. 3 is a diagram illustrating a configuration of a power supply system in a second exemplary embodiment of the present invention.

First of all, a configuration of a power supply system in the second exemplary embodiment of the present invention is described with referring to FIG. 3. FIG. 3 is a diagram illustrating the configuration of the power supply system in the second exemplary embodiment of the present invention.

As illustrated in FIG. 3, the power supply system in the second exemplary embodiment of the present invention includes a main power supply unit 201a and an auxiliary power supply unit 201b, a power meter 202, and a power supply control unit 203, as a power supply apparatus 200.

Output powers of the main power supply unit 201a and the auxiliary power supply unit 201b are integrated, and the integrated output power is supplied to a main-drive circuit 204a, and to a standby-drive circuit 204b whose power consumption is smaller than power consumption of the main-drive circuit 204a. A battery 205 is connected between each of the power supply units and the drive circuits.

The second exemplary embodiment of the present invention may be applicable to an apparatus which requires a large amount of electric power at the time of turning on the power supply, and requires standby electric power of a minimum amount at the time of turning off the power supply.

The main power supply unit 201a is a DC power supply source which performs AC/DC conversion or DC/DC conversion to output DC power $x_A$ as the output. The main power supply unit 201a is constituted of a circuit having a relatively large output power capacity and capable of driving the main-drive circuit 204a of large power consumption. A circuit constituting the main power supply unit 201a may be a double forward circuit or a full bridge circuit.

The auxiliary power supply unit 201b is also a DC power supply source which outputs DC power $x_B$ to the output stage. The auxiliary power supply unit 201b is constituted of a circuit having a relatively small output power capacity and capable of driving the standby-drive circuit 204a, whose power consumption is small. A circuit constituting the auxiliary power supply unit 201b may be a flyback circuit or a series regulator.

The input-output conversion model as expressed by Eq. (1) is set in each of the main power supply unit 201a and the auxiliary power supply unit 201b. The input-output conversion model may be stored in a setting area constituted of a non-volatile memory provided in each of the power supply units, for example. A specific input-output conversion model in the embodiment is described later.

The power meter 202 is connected to the output side of the main power supply unit 201a and the auxiliary power supply unit 201b to measure the sum of output powers of the power supply units. The method for measuring output powers may be a common (general) approach same as in the first exemplary embodiment. Therefore, description relating to the method for measuring output powers is omitted.

In the embodiment, an output power of each of the power supply units is supplied to the main-drive circuit 204a and to the standby-drive circuit 204b as a load. Thus, the output power measured by the power meter 202 stands for power consumption R of the drive circuits as a load.

The power supply control unit 203 adjusts the output power of each of the main power supply unit 201a and the auxiliary power supply unit 201b to realize maximum power conversion efficiency of the entire power supply system in response to power consumption R measured by the power meter 202. The power supply control unit 203, the main power supply unit 201a, the auxiliary power supply unit 201b, and the power meter 202 are communicatively connected to each other so as to transmit and receive various data and control signals, as well as in the first exemplary embodiment. As well as the power supply control unit 103 in the first exemplary embodiment, a well-known technique may be applied to a communication path (communication line) or a communication protocol for the connection.

The power supply control unit 203 includes a conversion function derivation unit 203a, an optimal-output-power calculation unit 203b, and a controller 203c. These constituent elements of the power supply control unit 203 are communicatively connected to each other so as to transmit and receive data and control commands. The known existing technique may be applied to a communication path (communication line) and a communication protocol between these constituent elements. As described in the first exemplary embodiment, when the power supply control unit 203 is constituted of general-purpose hardware resources, and a software program to be executed by the general-purpose hardware resources, each of the constituent elements of the power supply control unit 203 may be implemented as a module constituting the software program.

The conversion function derivation unit 203a refers to the input-output conversion models set in the main power supply unit 201a and in the auxiliary power supply unit 201b, and derives an input-output conversion function of the entire power supply system. A power supply detection signal 207 indicating the existence of a power supply unit may be input to the conversion function derivation unit 203a. The power supply detection signal may be a command of I2C communication as described above, but the exemplary embodiment is not limited to the above.

The optimal-output-power calculation unit 203b refers to the power consumption measured by the power meter 202, and to the input-output conversion model derived by the conversion function derivation unit 203a. Then, the optimal-output-power calculation unit 203b calculates output powers of the main power supply unit 201a and the auxiliary power supply unit 201b realizing a minimum input power of the entire power supply system in relation to the measured power consumption.

The controller 203c transmits a control signal to the main power supply unit 201a and to the auxiliary power supply unit 201b so as to output the output power calculated in the optimal-output-power calculation unit 203b. Thus, the controller 203c controls the output power of each of the power supply units.

The main-drive circuit 204a is a main load of the power supply system. The main-drive circuit 204a is driven when a power switch SW is turned on.

The standby-drive circuit 204b is a load to be driven in a standby condition when the power switch SW is turned off. It may be arbitrary whether or not the standby-drive circuit 204b is to be driven when the power switch SW is turned on. Power consumption of the standby-drive circuit 204b is smaller than power consumption of the main-drive circuit 204a.

The battery 205 is a secondary battery capable of storing predetermined electric power. The battery 205 supplies stored electric power, as measures against lowering of an output power of each of the power supply units or a sudden increase of power consumption of the drive circuits. Connecting the battery 205 to the power supply system may realize stable operation of the power supply system.

The battery 205 may be a secondary battery having an appropriate capacity or performance, taking consideration of power consumption at a load. In the embodiment, the battery 205 may be a secondary battery capable of retaining rated maximum outputs of the main power supply unit 201a and the auxiliary power supply unit 201b for a predetermined time or longer.

A voltage conversion unit 206 is a voltage conversion circuit for the standby-drive circuit 204b. The voltage conversion unit 206 may be any DC-DC converter. When the drive voltage of the standby-drive circuit 204b is different from the output voltage of each of the main power supply unit 201a and the auxiliary power supply unit 201b, the voltage conversion unit 206 converts an output power of each of the power supply units, and supplies the converted output power to the standby-drive circuit 204b. It is arbitrary whether or not the voltage conversion unit 206 is to be connected to the power supply system, according to the drive voltage of the standby-drive circuit 204b.

Next, an operation by the second exemplary embodiment of the present invention having the above configuration is described. The basic operation in the embodiment is substantially the same as the operation in the first exemplary embodiment described with referring to FIG. 2. In the following, the input-output conversion model of each of the main power supply unit 201a and the auxiliary power supply unit 201b, and the configuration and the operation of the power supply control unit 203, which are the characteristic elements in the embodiment, are mainly described.

In the embodiment, the input-output conversion model as expressed by Eq. (1) is set in each of the main power supply unit 201a and the auxiliary power supply unit 201b. In the following, an input-output conversion model proposed in the embodiment is described.

The input-output conversion model is obtained by modeling a process of converting an input power into an output power. In the embodiment, a model, capable of describing a phenomenon that occurs in the actual input-output conversion process, is applied as the input-output conversion model.

First of all, considering the relationship between input power Y and output power X in relation at each of the power supply units, there is an established relationship such that Y (an input power)=X (an output power)+L (a loss generated in the power supply unit).

A loss generated in the power supply unit (L) generally includes iron loss generated in a transformer, copper loss generated in a copper wire part such as a circuit wiring or a transformer, a Joule heat generated by impedance in the circuit, and drive power of a power supply unit itself such as an LED (Light Emitting Diode) or a control circuit. Generally, when the output voltage of a power supply unit is fixed, iron loss and drive power of the power supply unit itself are substantially constant, loss resulting from impedance in the circuit is proportional to output power, and copper loss is proportional to a square of output power.

Thus, as expressed by the following Eq. (5), it is considered that loss generated in a power supply unit is approximate to the sum of a component proportional to a square of output power, a component linearly proportional to output power, and a constant component. In the following Eq. (5), L indicates a loss, X indicates an output power, and A, B, C indicate coefficients inherent to the power supply unit.

$$L = AX^2 + BX + C \quad (5)$$

The coefficients A, B, and C of the quadratic function as expressed by Eq. (5) can be calculated by actually measuring an input power, an output power, and a generated loss in advance with respect to each of the power supply units, and by obtaining a quadratic approximation curve with respect to the actual measured values by a least-squares method.

Figure 4:
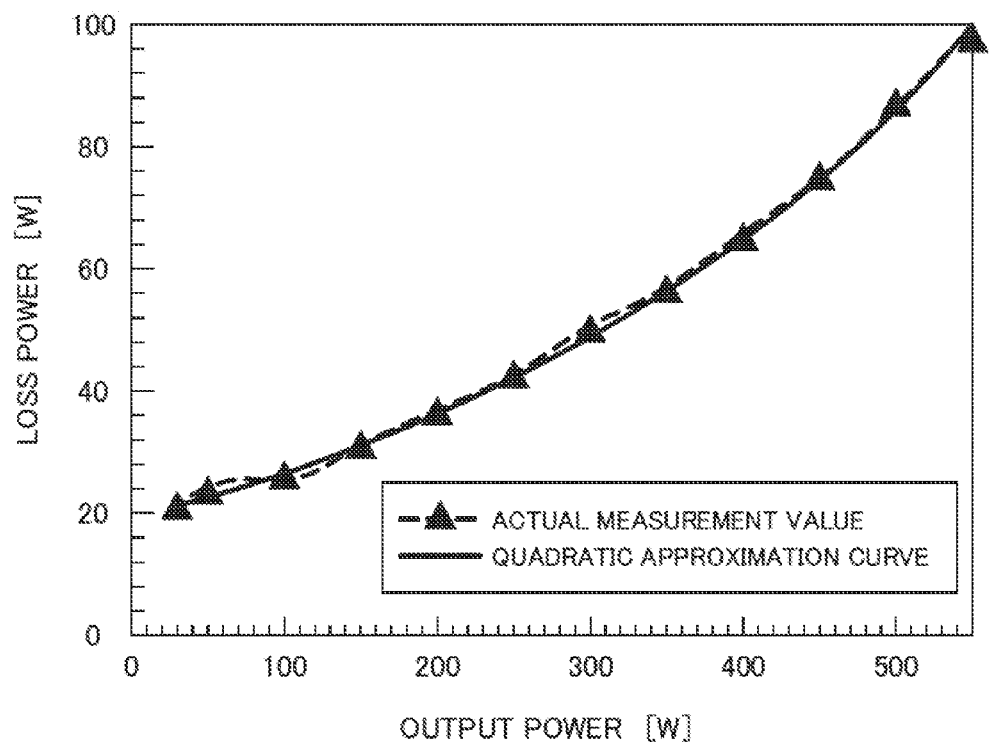
FIG. 4 is a diagram exemplifying an approximation curve by a quadratic function model relating to output power and actual measurement value of loss power.
Figure 5:
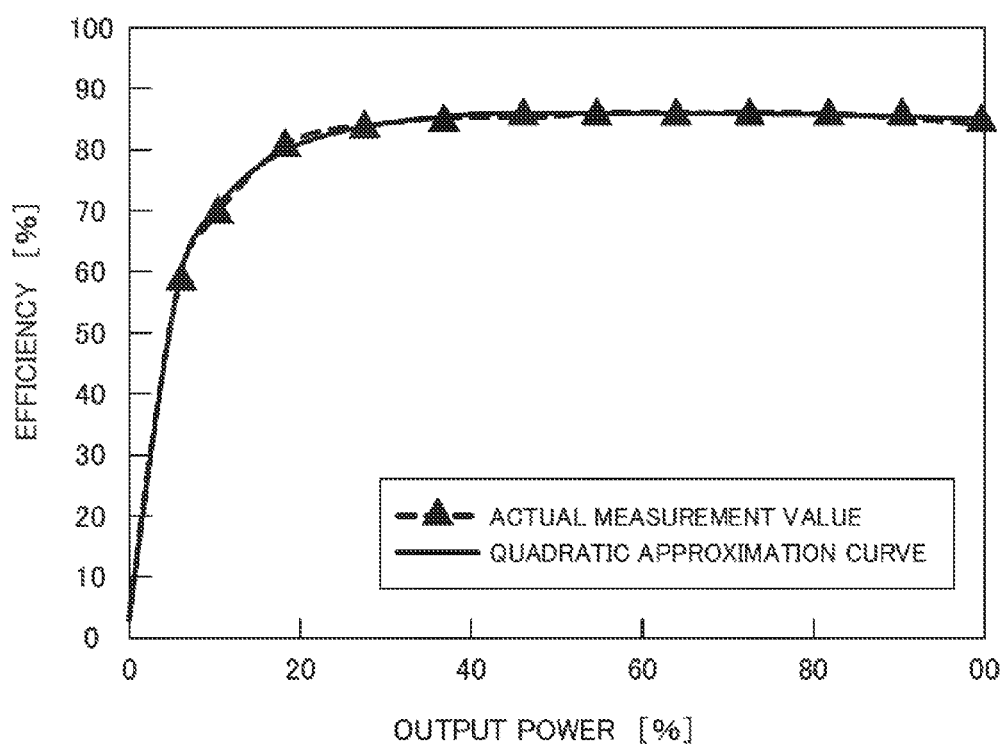
FIG. 5 is a diagram exemplifying an approximation curve by a quadratic function model relating to output power and actual measurement value of power conversion efficiency.

FIG. 4 is a diagram exemplifying an approximation curve when an actual measurement value of loss power in relation to output power is approximated using a quadratic function by a least-squares method. FIG. 5 is a diagram exemplifying an approximation curve obtained when an actual measurement value of input-output conversion efficiency is approximated using a quadratic function by a least-squares method. As illustrated in FIG. 4 and FIG. 5, it is possible to approximate actual measured values of input-output characteristics by using a quadratic function with sufficient precision.

As described above, it is considered that input power Y can be precisely approximated as a quadratic function of output power X, taking into consideration that the relationship: Y=X (an output power)+L (a loss) is established regarding to input power Y. Thus, in the embodiment, a quadratic function of an output power is applied as the input-output conversion model.

The quadratic functions as expressed by the following Eqs. (6) and (7) are applied as the input-output conversion model of each of the main power supply unit 201a and the auxiliary power supply unit 201b in the embodiment.

It is assumed that $y_A$ indicates an input power of the main power supply unit 201a, $x_A$ indicates an output power of the main power supply unit 201a, $y_B$ indicates an input power of the auxiliary power supply unit 201b, and $x_B$ indicates an output power of the auxiliary power supply unit 201b. The coefficients a, b, c, d, e, and f of the quadratic functions as expressed by the following equations are calculated from actual measured values of input-output characteristics which are measured separately with respect to the main power supply unit 201a and the auxiliary power supply unit 201b, with use of a least-squares method; and are set in advance in the setting area of each of the power supply units.

$$y_A = ax_A^2 + bx_A + c \quad (6)$$

$$y_B = dx_B^2 + ex_B + f \quad (7)$$

Next, a specific configuration and operation of the power supply control unit 203 are described.

First of all, the configuration and operation of the conversion function derivation unit 203a are described. The conversion function derivation unit 203a is communicatively connected to the main power supply unit 201a and to the auxiliary power supply unit 201b, and refers to the input-output conversion model of each of the power supply units. A method for referring to the input-output conversion model may be such that acquiring information relating to coefficients of a quadratic function set in each of the power supply units as data via the aforementioned communication path.

The input-output conversion models of the main power supply unit 201a and the auxiliary power supply unit 201b are respectively expressed by $f_A$ and $f_B$. The following Eq. (8) is obtained from Eq. (4).

$$Y = \sum_{i=A}^{B} y_i = y_A + y_B = f_A(x_A) + f_B(x_B) \tag{8}$$

Applying Eqs. (6) and (7) to Eq. (8) yields the following Eq. (9) as an input-output conversion function.

$$\begin{aligned} Y &= \sum_{i=A}^{B} y_i \\ &= \sum_{i=A}^{B} f_i(x_i) \\ &= f_A(x_A) + f_B(x_B) \\ &= ax_A^2 + bx_A + c + dx_B^2 + ex_B + f \end{aligned} \tag{9}$$

The conversion function derivation unit 203a notifies the input-output conversion function as expressed by Eq. (9) to the optimal-output-power calculation unit 203b to by predetermined notification means. The conversion function derivation unit 203a may notify the coefficients of the quadratic function as expressed by Eq. (9) as data to the optimal-output-power calculation unit 203b via the communication path. Specific notification means may be selected appropriately by a connection method between the conversion function derivation unit 203a and the optimal-output-power calculation unit 203b. The notification means may be a command of I2C communication as described above, but the embodiment is not limited to the above.

Next, an operation by the optimal-output-power calculation unit 203b is described. The optimal-output-power calculation unit 203b refers to power consumption at the load measured by the power meter 202, and to the input-output conversion function derived in the conversion function derivation unit 203a. Then, the optimal-output-power calculation unit 203b calculates $x_A$ and $x_B$ realizing minimum input power Y as expressed by Eq. (9), based on the referred result.

More specifically, the optimal-output-power calculation unit 203b calculates output powers $x_A$ and $x_B$ realizing minimum input power Y in each of the following three cases. Specifically, these three cases are the case (i) in which both of the main power supply unit 201a and the auxiliary power supply unit 201b are operated, the case (ii) in which only the main power supply unit 201a is operated, and the case (iii) in which only the auxiliary power supply unit 201b is operated.

In the case (i) in which both of the main power supply unit 201a and the auxiliary power supply unit 201b are operated, the optimal-output-power calculation unit 203b calculates input power Y, and output powers $x_A$ and $x_B$ as follows. By assuming that R is power consumption at the load measured by the power meter 202, the following Eq. (10) is obtained from Eq. (2).

$$R = x_A + x_B \tag{10}$$

An equation: $x_B = R - x_A$ is derived from Eq. (10). Applying the equation to Eq. (9), which is the input-output conversion function notified from the conversion function derivation unit 203a, yields the following Eq. (11).

$$Y = ax_A^2 + bx_A + c + dx_B^2 + ex_B + f = ax_A^2 + bx_A + c + d(R - x_A)^2 + e(R - x_A) + f \tag{11}$$

When input power Y is minimum, a differential value of Y is: Y'=0. Then, the following Eq. (12) is obtained.

$$Y' = 2(a+d)x_A + b - 2dR - e = 0 \tag{12}$$

Then, the optimal-output-power calculation unit 203b calculates optimal output powers with respect to the main power supply unit 201a and with respect to the auxiliary power supply unit 201b as follows.

$$x_A = \frac{e + 2dR - b}{2(a+d)} \tag{13}$$

$$\begin{aligned} x_B &= R - x_A \\ &= \frac{b + 2aR - e}{2(a+d)} \end{aligned} \tag{14}$$

As described above, the optimal-output-power calculation unit 203b is capable of calculating output powers $x_A$ and $x_B$, with use of power consumption R in the load measured by the power meter 202, and the specific coefficients (a to f) of the quadratic function model derived by the conversion function derivation unit 203a. That is, the optimal-output-power calculation unit 203b is capable of calculating output powers $x_A$ and $x_B$ by substituting the power consumption R and the specific coefficients of the quadratic function model into Eqs. (13) and (14).

The optimal-output-power calculation unit 203b is capable of calculating input power Y in the above case by substituting $x_A$ and $x_B$ that have been calculated with use of Eqs. (13) and (14) into Eq. (11).

In the embodiment, the optimal-output-power calculation unit 203b may hold (contain) Eq. (11), Eq. (13), and Eq. (14). The optimal-output-power calculation unit 203b may hold the equations by a method appropriate for the configuration of the power supply control unit 203. For example, when the power supply control unit 203 is configured to be single hardware device (such like a circuit), a logic corresponding to the equations may be implemented by a circuit. When the power supply control unit is constituted of hardware such as general-purpose CPU and a memory, and a software program as described above, the equations may be stored in the software program. That is, the the equations may be implemented in the software program.

Next, in the case (ii), in which only the main power supply unit 201a is operated, the optimal-output-power calculation unit 203b calculates input power Y, and output powers $x_A$ and $x_B$ as follows. First of all, it is assumed that R is power consumption at the load measured by the power meter 202, when the auxiliary power supply unit 201b is stopped and an output power of the auxiliary power supply unit 201b is set such that $x_B = 0$. In this case, the following Eq. (15) is obtained from Eq. (2).

$$R = x_A \tag{15}$$

The following Eq. (16A) is obtained from Eq. (8).

$$Y = \sum_{i=A}^{B} y_i \qquad (16A)$$

$$= \sum_{i=A}^{B} f_i(x_i)$$

$$= aR^2 + bR + c + f$$

The coefficient f of Eq. (16A) corresponds to standby electric power of the auxiliary power supply unit 201b. In the embodiment, the auxiliary power supply unit 201b may be completely stopped, and an input power of the auxiliary power supply unit 201b may be set such that $y_B=0$. The total input power in the above case is expressed by the following Eq. (16B).

$$Y = \sum_{i=A}^{B} y_i \qquad (16B)$$

$$= y_A$$

$$= aR^2 + bR + c$$

The optimal-output-power calculation unit 203b refers to power consumption R at the load measured by the power meter 202, and specific coefficients of the quadratic function model derived by the conversion function derivation unit 203a. Then, the optimal-output-power calculation unit 203b is capable of calculating input power Y and output power $x_A$ by substituting these values into the above equation.

The optimal-output-power calculation unit 203b may hold Eq. (16A) or (16B). As described above, the optimal-output-power calculation unit 203b may hold the above equation by a method appropriate for the configuration of the power supply control unit.

The power supply control unit 203 in the embodiment may select Eq. (16A) or (16B) appropriately as the equation for calculating an input power in response to a configuration of each of the power supply units, and of the power supply control unit 203. For example, when the power supply control unit 203 controls the auxiliary power supply unit 201b to be in a standby condition, Eq. (16A) may be selected; and when the power supply control unit 203 controls the auxiliary power supply unit 201b to completely stop, Eq. (16B) may be selected.

Next, in the case (iii), in which only the auxiliary power supply unit 201b is operated, the optimal-output-power calculation unit 203b calculates input power Y, and output powers $x_A$ and $x_B$ as follows. It is assumed that R is power consumption at the load measured by the power meter 202, when the main power supply unit 201a is stopped and an output power of the main power supply unit 201a is set such that $x_A=0$. In this case, the following Eq. (17) is obtained from Eq. (2).

$$R = x_B \qquad (17)$$

The following Eq. (18A) is obtained from Eq. (8).

$$Y = \sum_{i=A}^{B} y_i \qquad (18A)$$

$$= \sum_{i=A}^{B} f_i(x_i)$$

$$= dR^2 + eR + c + f$$

The coefficient c of Eq. (18A) corresponds to standby electric power of the main power supply unit 201a. In the embodiment, the main power supply unit 201a may be completely stopped, and an input power of the main power supply unit 201a may be set such that $y_A=0$. The total input power in the above case is expressed by the following Eq. (18B).

$$Y = \sum_{i=A}^{B} y_i \qquad (18B)$$

$$= y_B$$

$$= dR^2 + eR + f$$

The optimal-output-power calculation unit 203b refers to power consumption R at the load measured by the power meter 202, and specific coefficients of the quadratic function model derived by the conversion function derivation unit 203a. Then, the optimal-output-power calculation unit 203b substitute these values into the above equation, whereby the optimal-output-power calculation unit 203b is capable of calculating input power Y and output power $x_B$.

The optimal-output-power calculation unit 203b may hold Eq. (18A) or (18B). As described above, the optimal-output-power calculation unit 203b may hold the above equation by a method appropriate for the configuration of the power supply control unit. In the embodiment, as well as in the case (ii) as described above, the power supply control unit 203 may select Eq. (18A) or (18B) appropriately as the equation for calculating an input power in response to an exemplary configuration of each of the power supply units, and of the power supply control unit 203.

The optimal-output-power calculation unit 203b compares calculated input powers Y with respect to the cases (i) to (iii). As a result of the comparison, the optimal-output-power calculation unit 203b selects $x_A$ and $x_B$ realizing minimum input power Y, as optimal output powers for the main power supply unit 201a and for the auxiliary power supply unit 201b. The optimal-output-power calculation unit 203b notifies the selected $x_A$ and $x_B$ to the controller 203c connected to the optimum power calculation unit 203b.

The optimal-output-power calculation unit 203b may select a notification means appropriate for the connection method between the optimal-output-power calculation unit 203b and the controller 203c. For example, the optimal-output-power calculation unit 203b may use a command of I2C communication as described above, as the notification means, but the embodiment is not limited to the above.

Next, an operation by the controller 203c is described. The controller 203c controls the main power supply unit 201a and the auxiliary power supply unit 201b so as to output the output power notified from the optimal-output-power calculation unit 203b.

As an example, The controller 203c in the embodiment applies a method for adjusting the output voltage ratio between the main power supply unit 201a and the auxiliary power supply unit 201b, for controlling the output voltage.

In the following, the method for adjusting the output voltage ratio is described with referring to FIG. 6.

Figure 6:
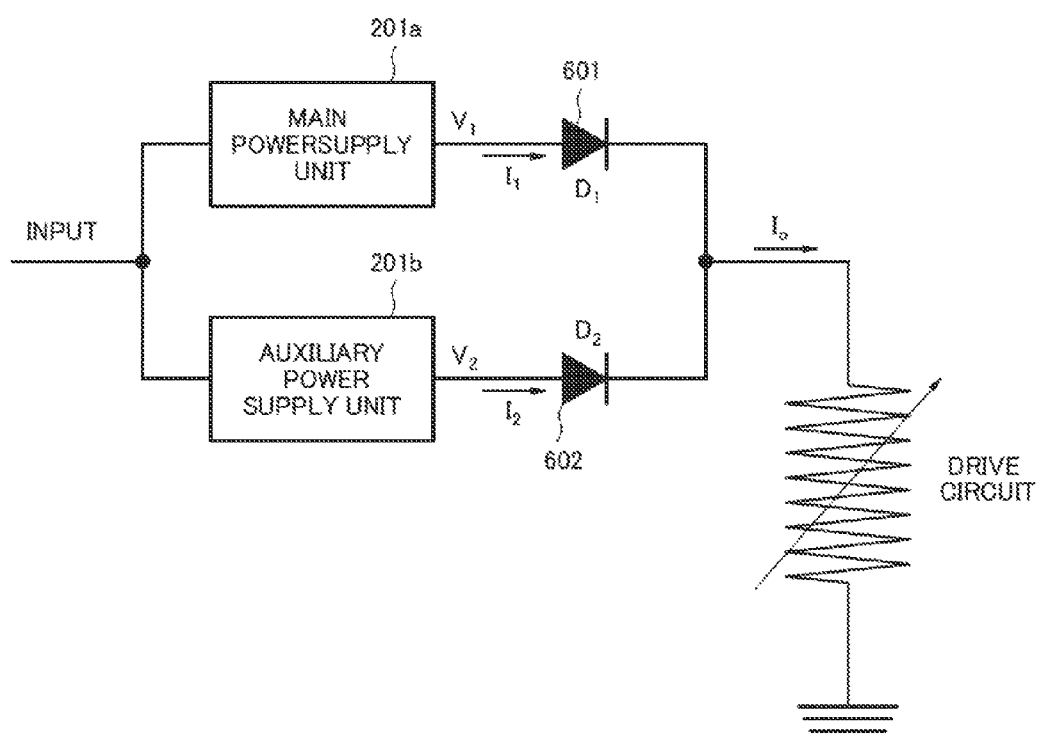
FIG. 6 is a diagram illustrating an example of a circuit configuration for adjusting the voltages of power supply units in the second exemplary embodiment of the present invention.

Referring to FIG. 6, $V_1$ and $V_2$ respectively indicate output voltages of the main power supply unit 201a and the auxiliary power supply unit 201b, $I_1$ and $I_2$ respectively indicate currents flowing through a diode 601 and a diode 602, and $I_O$ indicates a total output current to be supplied to the load.

It is assumed that an impedance of a load is Z. It is assumed that each of resistance values of the diode 601 and of the diode 602 in plus-direction is R. In this case, the following equations are established regarding the circuit illustrated in FIG. 6 by Kirchhoff's law.

$$I_1 + I_2 = I_O$$

$$V_1 - V_2 = I_1 R - I_2 R$$

$$V_2 = I_2 R + I_O Z$$

With use of the above equation, $I_1$ and $I_2$ are obtained as expressed by the following equations.

$$I_2 = \frac{V_2 R - Z(V_1 - V_2)}{R(2Z + R)} \tag{19}$$

$$I_1 = \frac{V_1 - V_2}{R} + \frac{V_2 R - Z(V_1 - V_2)}{R(2Z + R)} = \frac{(R + Z)V_1 - ZV_2}{(2Z + R)} \tag{20}$$

In the case in which only the main power supply unit 201a is operated, the controller 203c controls to realize $I_2 = 0$. Assuming that $I_2 = 0$ in Eq. (19), the following Eq. (21) is obtained.

$$V_1 = \frac{R + Z}{Z} V_2 \tag{21}$$

In the case in which only the auxiliary power supply unit 201b is operated, the controller 203c controls to realize $I_1 = 0$. Assuming that $I_1 = 0$ in Eq. (20), the following Eq. (22) is obtained.

$$V_1 = \frac{Z}{R + Z} V_2 \tag{22}$$

By assuming that Eqs. (21) and (22) are boundary conditions for switching the output between the main power supply unit 201a and the auxiliary power supply unit 201b, the controller 203c is capable of switching the output between the main power supply unit 201a and the auxiliary power supply unit 201b by adjusting $V_1$ and $V_2$ to satisfy the following Eqs. (23) to (25).

When the controller 203c adjusts $V_1$ and $V_2$ so as to establish the following Eq. (23), only the main power supply unit 201a is operated, and $I_1$ is output.

$$V_1 \geq \frac{R + Z}{Z} V_2 \tag{23}$$

Next, when the controller 203c adjusts $V_1$ and $V_2$ so as to establish the following Eq. (24), both of the main power supply unit 201a and the auxiliary power supply unit 201b are operated, and $I_1$ and $I_2$ are output.

$$\frac{R + Z}{Z} V_2 > V_1 > \frac{Z}{R + Z} V_2 \tag{24}$$

Next, when the controller 203c adjusts $V_1$ and $V_2$ so as to establish the following Eq. (25), only the auxiliary power supply unit 201b is operated, and only $I_2$ is output.

$$\frac{Z}{R + Z} V_2 \geq V_1 \tag{25}$$

As described above, the controller 203c is capable of adjusting the output currents $I_1$ and $I_2$ by adjusting the ratio between $V_1$ and $V_2$. As a result of the above adjustment, the controller 203c is capable of adjusting the output powers of the main power supply unit 201a and the auxiliary power supply unit 201b.

The method for controlling the voltage of each of the power supply units may be a method appropriate for a specific circuit configuration of the power supply unit. For example, a well-known configuration such as a voltage-variable linear regulator or a PWM-controlled switching regulator is applicable as the voltage control method. Therefore, detailed description of the voltage control method is omitted in the specification of the present application.

When only either the main power supply unit 201a or the auxiliary power supply unit 201b is operated, the controller 203c may completely stop the power supply unit that is not operated, by controlling the output voltage of the power supply unit that is not operated to be zero.

Output powers of the main power supply unit 201a and the auxiliary power supply unit 201b are controlled to realize the minimum total input power in response to power consumption in the main-drive circuit 204a and in the standby-drive circuit 204b by the operation of the power supply control unit 203 as described above. As a result of the control, conversion efficiency of the entire power supply system is optimized.

In the second exemplary embodiment, a power supply circuit whose power conversion efficiency is high in a high load range where an output power is relatively large is applied as the main power supply unit 201a, and a power supply circuit whose power conversion efficiency is high in a low load range where an output power is relatively small is applied as the auxiliary power supply unit 201b. In this case, the output power of each of the power supply units is controlled as follows.

When the switch SW is turned off, the standby-drive circuit 204b of relatively small power consumption is driven. Since power consumption of the standby-drive circuit 204b is relatively small, the power supply control unit 203 may calculate such that the input power is minimum when only the auxiliary power supply unit 201b is operated. In this case, the power supply control unit controls the output voltage of each of the power supply units so that only the auxiliary power supply unit 201b is operated. In this case, the power supply control unit 203 may completely stop the main power supply unit 201a.

Next, when the switch SW is turned on to drive the main-drive circuit 204a, the power supply control unit 203 controls the output voltages of the main power supply unit 201a and the auxiliary power supply unit 201b to realize a minimum input power in response to power consumption of the main-drive circuit 204a. In this case, the power supply control unit 203 controls the output voltages of the main power supply unit 201a and the auxiliary power supply unit 201b so that both of the main power supply unit 201a and the auxiliary power supply unit 201b are operated, or only the main power supply unit 201a is operated. When only the main power supply unit 201a is operated, the power supply control unit 203 may completely stop the auxiliary power supply unit 201b.

Thus, the power supply control unit 203 adjusts the output voltage of each of the power supply units to realize maximum power conversion efficiency in response to power consumption variation of the drive circuits as a load. Hereby, the power supply control unit 203 performs a switching operation for the power supply units.

According to the power supply system of the present embodiment as described above, in a power supply system including the main power supply unit 201a and the auxiliary power supply unit 201b, the power supply control unit 203 utilizes an input-output conversion model that represents an input power as a quadratic function of an output power. And, the power supply control unit 203 calculates the input power by using the input-output conversion model and power consumption R (as a output power) measured by the power meter 202. Then, the power supply control unit 203 controls the output voltage of each of the power supply units to realize the minimum calculated input power.

As a result of the control, there is obtained a power supply system, in which the main power supply unit 201a and the auxiliary power supply unit 201b are switched over in response to power consumption R of the drive circuits, and an input power in relation to power consumption R is minimized.

<Third Exemplary Embodiment>

Next, a third exemplary embodiment of the present invention based on the power supply system in the second exemplary embodiment is described.

In the following description, a characteristic configuration according to the present embodiment is mainly described. The elements in the third exemplary embodiment substantially identical or equivalent to those in the first and second exemplary embodiments are indicated with the same reference numerals, and repeated description thereof is omitted.

Figure 7:
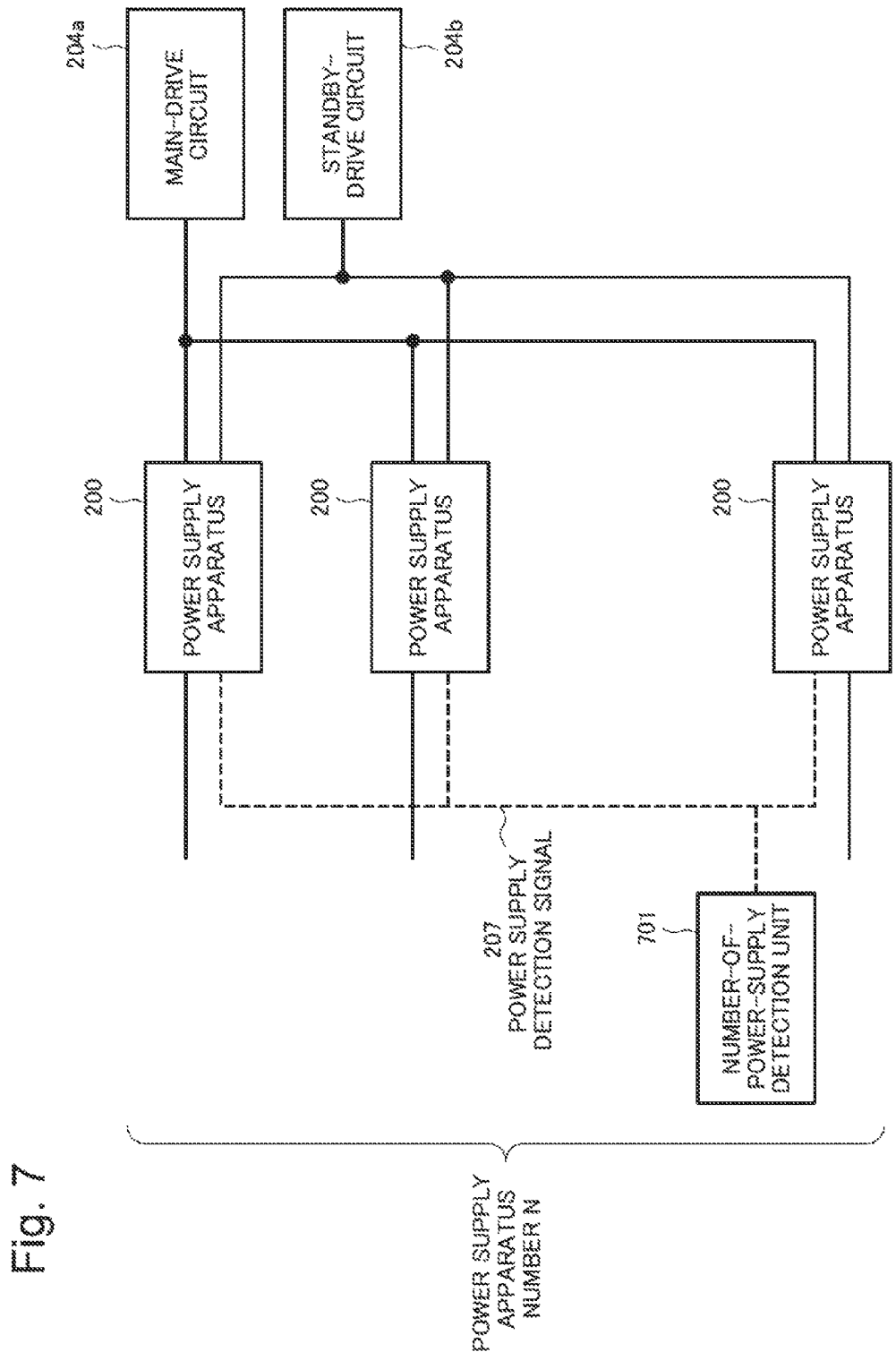
FIG. 7 is a diagram illustrating a configuration of a power supply system in a third exemplary embodiment of the present invention.

First of all, the third exemplary embodiment of the present invention is described with referring to FIG. 7. FIG. 7 is a diagram illustrating a configuration of a power supply system in the third exemplary embodiment of the present invention.

As illustrated in FIG. 7, in the third exemplary embodiment of the present invention, a plurality of power supply apparatuses 200 in the second exemplary embodiment are connected in parallel to each other, the outputs of the power supply apparatuses 200 are integrated, and the integrated output is supplied to a main-drive circuit 204a and to a standby-drive circuit 204b.

The third exemplary embodiment of the present invention having the above configuration may be applicable to a load distribution of power supply units, or, to a redundant configuration of power supply units.

In the power supply apparatus 200 in the third exemplary embodiment, a power supply control unit 203 identify the number of power supply units which is included in the entire power supply system by referring to a power supply detection signal 207.

As a method for identifying the number of power supply units, for example, a number-of-power-supply detection unit 701 may be provided to detect an existence signal to be output from each of the power supply units, and the number-of-power-supply detection unit 701 may notify the detected number to the power supply control unit 203 in each of the power supply apparatus 200. The specific method for detecting the number of power supply units is not limited to the above. For example, in a case that a plurality of power supply apparatus are connected to each other, a specific one of the power supply apparatus may be selected as a master power supply having substantially the same function as the number-of-power supply detection unit 701. The master power supply may detect existence signals of power supply units included in the power supply system, and may notify a detection result to the power supply control unit 203 in each of the power supply apparatus 200.

Alternatively, each of the power supply apparatus connected to each other may identify the number of power supply units by transmitting to and receiving from each other the existence signal indicating the existence of the power supply apparatus itself.

An existing technique may be applied to a communication path and a communication protocol for use in connection among the power supply units and each of the power supply units and the number-of-power-supply detection unit 701, as well as the power supply control unit 103 in the first exemplary embodiment.

Next, an operation of the third exemplary embodiment of the present invention having the above configuration is described. The third exemplary embodiment is configured such that N (where N is a positive integer of 2 or larger) power supply apparatuses 200 in the second exemplary embodiment are connected in parallel to each other, and the respective power supply apparatuses output the same power. The other configuration in the third exemplary embodiment is substantially the same as in the second exemplary embodiment. In the following, a portion different from the second exemplary embodiment is mainly described. In particular, an operation of a conversion function derivation unit 203a and an operation of an optimal-output-power calculation unit 203b are described.

First of all, the operation of the conversion function derivation unit 203a is described. As well as in the second exemplary embodiment, the conversion function derivation unit 203a refers to the input-output conversion model set in each of the power supply units in each of the power supply apparatus. Further, the conversion function derivation unit 203a derives the following Eq. (26) as an input-output conversion function by referring to the number N of the power supply apparatuses. The number N of power supply apparatuses 200 have the same configuration as each other. Thus, the total input power is equal to a value obtained by multiplying the input power of a specific power supply apparatus by N.

$$Y = \sum_{i=1}^{N} y_i = N(f_A(x_A) + f_B(x_B)) = N(ax_A^2 + bx_A + c + dx_B^2 + ex_B + f) \quad (26)$$

The conversion function derivation unit 203a notifies the input-output conversion function as expressed by Eq. (26) to the optimal-output-power calculation unit 203b by predetermined notification means. The specific notification means to the optimal-output-power calculation unit 203b may be the same as in the second exemplary embodiment. Therefore, description of the specific notification means is omitted.

As well as in the second exemplary embodiment, the optimal-output-power calculation unit 203b refers to power consumption of the drive circuits, which is a load measured by a power meter 202, and to the input-out conversion function derived by the conversion function derivation unit 203a. Then, the optimal-output-power calculation unit 203b calculates $x_A$ and $x_B$ realizing a minimum input power Y as expressed by Eq. (26), based on the referred values.

The optimal-output-power calculation unit 203b calculates $x_A$ and $x_B$ realizing minimum input power Y with respect to each of the power supply apparatuses 200 in following three cases: the case (i) in which both of a main power supply unit 201a and an auxiliary power supply unit 201b in each of the power supply apparatuses 200 are operated, the case (ii) in which only the main power supply unit 201a in each of the power supply apparatuses 200 is operated, and the case (iii) in which only the auxiliary power supply unit 201b in each of the power supply apparatuses 200 is operated.

In the case (i) in which both of the main power supply unit 201a and the auxiliary power supply unit 201b in each of the power supply apparatuses 200 are operated, the optimal-output-power calculation unit 203b calculates input power Y, and output powers $x_A$ and $x_B$ as follows.

First of all, it is assumed that R is power consumption of the drive circuits as a load. When the number N of power supply apparatuses 200 output the same output power, the following Eq. (27) is obtained from Eq. (2).

$$R = N(x_A + x_B) \tag{27}$$

As well as in the second exemplary embodiment, calculating $x_A$ and $x_B$ realizing minimum input power Y from Eqs. (26) and (27) yields the following equations.

$$x_A = \frac{Ne + 2dR - Nb}{2N(a+d)} \tag{28}$$

$$x_B = \frac{R}{N} - x_A = \frac{Nb + 2aR - Ne}{2N(a+d)} \tag{29}$$

As described above, the optimal-output-power calculation unit 203b refers to power consumption R of the drive circuits measured by the power meter 202, specific coefficients of the quadratic function model derived by the conversion function derivation unit 203a, and the number N of the power supply apparatuses. Then, the optimal-output-power calculation unit 203b calculates output powers $x_A$ and $x_B$ by substituting these values into Eqs. (28) and (29).

Input power Y in the above case is calculated by substituting $x_A$ and $x_B$ calculated from Eqs. (28) and (29) into Eq. (26). In the embodiment, the optimal-output-power calculation unit 203b may hold (contain) Eqs. (26), (28), and (29). The specific method for holding the equations may be substantially the same as in the second exemplary embodiment, and therefore, description thereof is omitted.

Next, in the case (ii) in which only the main power supply unit 201a in each of the power supply apparatuses 200 is operated, the optimal-output-power calculation unit 203b calculates input power Y, and output powers $x_A$ and $x_B$ as follows.

First of all, it is assumed that R is power consumption of the drive circuits measured by the power meter 202 when the auxiliary power supply unit 201b is stopped and an output power of the auxiliary power supply unit 201b is set (controlled) such that $x_B=0$. In this case, the following Eq. (30) is obtained from Eq. (2).

$$R = Nx_A \tag{30}$$

The following Eq. (31A) is obtained from Eq. (26).

$$Y = N\left\{a\left(\frac{R}{N}\right)^2 + b\left(\frac{R}{N}\right) + c + f\right\} \tag{31A}$$

As well as in the second exemplary embodiment, the coefficient f of Eq. (31A) corresponds to standby electric power of each of the auxiliary power supply units 201b. In the embodiment of the present invention, the auxiliary power supply unit 201b may be completely stopped, and an input power of the auxiliary power supply unit 201b may be set such that $y_B=0$. The total input power in the above case is expressed by the following Eq. (31B).

$$Y = N\left\{a\left(\frac{R}{N}\right)^2 + b\left(\frac{R}{N}\right) + c\right\} \tag{31B}$$

The optimal-output-power calculation unit 203b refers to power consumption R of the drive circuits measured by the power meter 202, specific coefficients of the quadratic function model derived by the conversion function derivation unit 203a, and the number N of the power supply apparatuses. Then, the optimal-output-power calculation unit 203b is capable of calculating input power Y and output power $x_A$ by substituting the referred values into the above equation.

In the embodiment, the optimal-output-power calculation unit 203b may hold Eq. (31A) or (31B). As well as in the second exemplary embodiment, in the embodiment, the power supply control unit 203 may select Eq. (31A) or (31B) appropriately as the equation for calculating an input power in response to a configuration of each of the power supply units, and of the power supply control unit 203.

Next, in the case (iii) in which only the auxiliary power supply unit 201b in each of the power supply apparatus 200 is operated, the optimal-output-power calculation unit 203b calculates input power Y, and output powers $x_A$ and $x_B$ as follows.

First of all, it is assumed that R is power consumption of the drive circuits measured by the power meter 202 when the main power supply unit 201a is stopped and an output power of the main power supply unit 201a is set such that $x_A=0$. In this case, the following Eq. (32) is obtained from Eq. (2).

$$R = Nx_B \tag{32}$$

The following Eq. (33A) is obtained from Eq. (26).

$$Y = N\left\{d\left(\frac{R}{N}\right)^2 + e\left(\frac{R}{N}\right) + c + f\right\} \tag{33A}$$

As well as in the second exemplary embodiment, the coefficient c of Eq. (33A) corresponds to standby electric power of each of the main power supply units 201a. In the embodiment of the present application, the main power supply unit 201a may be completely stopped, and an input power of the main power supply unit 201a may be set such that $y_A=0$. The total input power in the above case is expressed by the following Eq. (33B).

$$Y = N\left\{d\left(\frac{R}{N}\right)^2 + e\left(\frac{R}{N}\right) + f\right\} \tag{33B}$$

The optimal-output-power calculation unit 203b refers to power consumption R of the drive circuits measured by the power meter 202, specific coefficients of the quadratic function model derived by the conversion function derivation unit 203a, and the number N of the power supply apparatuses. Then, the optimal-output-power calculation unit 203b is capable of calculating input power Y and output power $x_B$ by substituting the referred values into the above equation. In the embodiment, it is possible to derive Equation (33A) or (33B) in advance. Therefore, the optimal-output-power calculation unit 203b may hold the above equation. As well as in the second exemplary embodiment, the power supply control unit 203 in the embodiment may select Eq. (33A) or (33B) appropriately as the equation for calculating an input power in response to an configuration of each of the power supply units, and of the power supply control unit 203.

The optimal-output-power calculation unit 203b compares calculated input powers Y with respect to the cases (i) to (iii). Then, the optimal-output-power calculation unit 203b selects $x_A$ and $x_B$ realizing minimum input power Y, as optimal output powers for the main power supply unit 201a and for the auxiliary power supply unit 201b. The optimal-output-power calculation unit 203b notifies the selected $x_A$ and $x_B$ to a controller 203c connected to the optimum power calculation unit 203b. The specific notification means may be the same as in the second exemplary embodiment.

The controller 203c, in response to receiving the notification from the optimal-output-power calculation unit 203b, controls output powers of the main power supply unit 201a and the auxiliary power supply unit 201b in each of the power supply apparatuses so as to output the output power notified from the optimal-output-power calculation unit 203b. The specific method for controlling the output power may be the same as in the second exemplary embodiment.

According to the power supply system of the present embodiment as described above, in a power supply system including a plurality of power supply apparatuses 200, output powers of the main power supply unit 201a and the auxiliary power supply unit 201b in each of the power supply apparatuses 200 are controlled to realize a minimum input power in relation to power consumption R of the drive circuits. Thus, according to the power supply system of the present embodiment, it is possible to obtain a power supply system which is operated with optimal power conversion efficiency.

A plurality of power supply apparatuses 200 are connected in parallel to each other. Therefore, it is possible to configure a redundant power supply system. Specifically, even when failure occurs in a specific one of the power supply apparatuses 200, and the failed power supply apparatus 200 is taken away from the power supply system, the power supply control unit 203 in the other power supply apparatuses is capable of deriving an input-output conversion function, in which the number N of power supply apparatuses to be operated is changed. Then, each of the power supply control units is capable of calculating an output power of each of the power supply units based on the derived input-output conversion function, and controlling each of the power supply units to output the calculated output power. Thus, the power supply system according to the present embodiment is capable of continuing to operate in a state that power conversion efficiency is optimized with use of the remaining power supply apparatuses 200.

<Fourth Exemplary Embodiment>

Next, a fourth exemplary embodiment of the present invention is described.

In the following description, a characteristic configuration according to the present exemplary embodiment is mainly described. The elements in the fourth exemplary embodiment substantially identical or equivalent to those in the first to third exemplary embodiments are indicated with the same reference numerals, and repeated description thereof is omitted.

Figure 8:
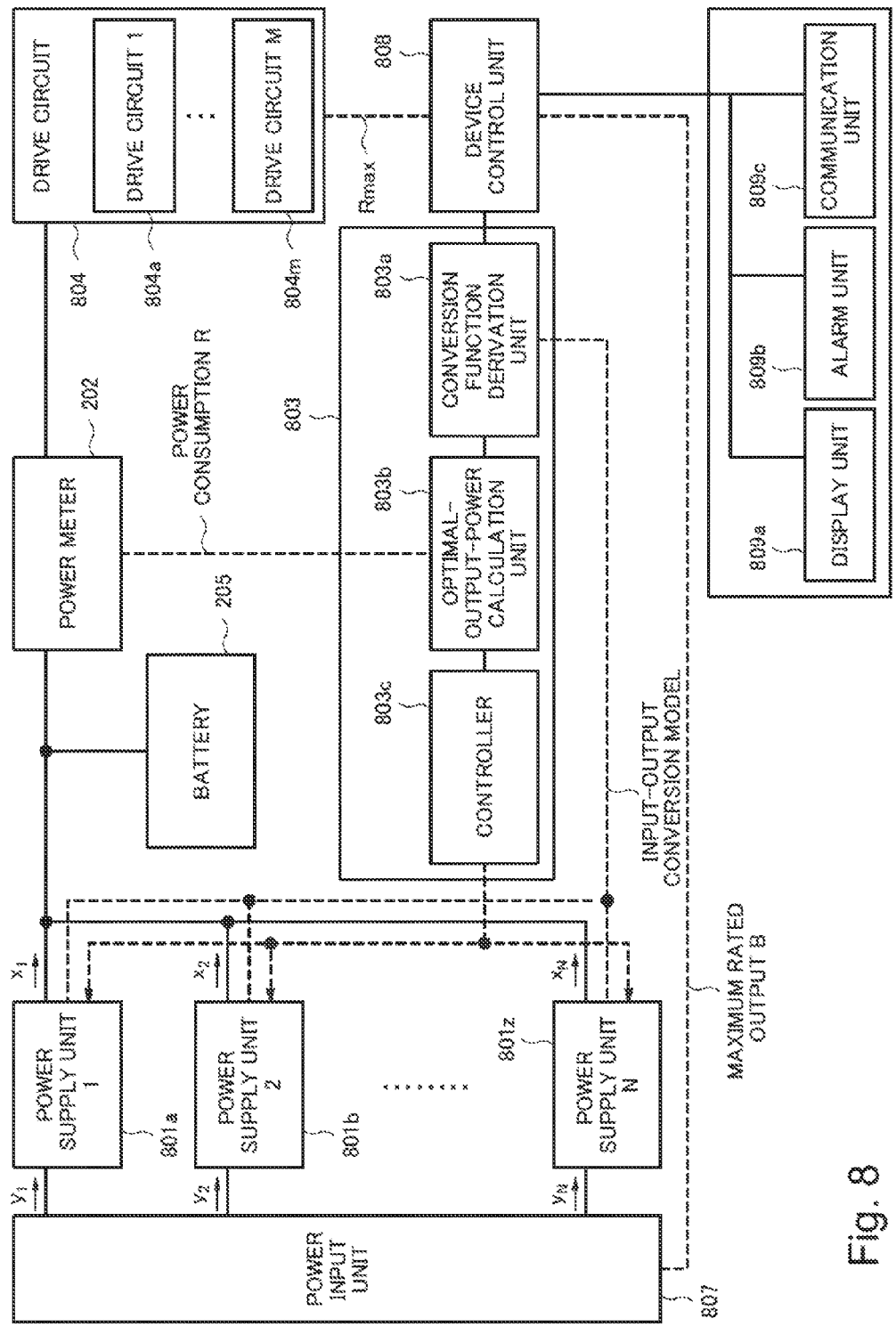
FIG. 8 is a diagram illustrating a configuration of a power supply system in a fourth exemplary embodiment of the present invention.

First of all, the configuration of the fourth exemplary embodiment is described with referring to FIG. 8. FIG. 8 is a diagram illustrating a configuration of a power supply system in the fourth exemplary embodiment of the present invention.

As illustrated in FIG. 8, the power supply system in the fourth exemplary embodiment of the present invention is mainly constituted of power supply units 801a to 801z, a power meter 202 having the same configuration as in the second exemplary embodiment, a power supply control unit 803, and a device control unit 808.

Output powers of the power supply units are integrated, and the integrated output power is supplied to a drive circuit 804. As well as in the second exemplary embodiment, a battery 205 is connected between each of the power supply units and the drive circuit 804 as a load. As well as the third exemplary embodiment, the fourth exemplary embodiment of the present invention having the above configuration is applicable to distributing the load of power supply units, and to a redundant configuration of power supply units.

As well as in the second exemplary embodiment of the present invention, the power supply units 801a to 801z are DC power supply sources which perform AC/DC conversion or DC/DC conversion to output DC power as an output. An input-output conversion model expressing power conversion between input power and output power, as expressed by Eq. (1), is set in each of the power supply units. In the embodiment, as well as the second and third exemplary embodiments, a quadratic function of an output power is set as the input-output conversion model in each of the power supply units.

The power supply system according to the present embodiment includes the number N (where N is a positive integer of 2 or larger) of power supply units. The respective power supply units 801a to 801z may be power supply units having the same rated specification, or may be power supply units of different types based on different rated specifications.

A power input unit 807 for supplying electric power to each of the power supply units is connected to the input side of each of the power supply units. The power input unit 807 may be connected to a power supply source such as a commercial power supply system, a power generator, or an interruptible power supply apparatus. Rated maximum output power B is set in the power input unit in the embodiment. The rated maximum output power B may be stored in a non-volatile memory provided in the power input unit 807 with use of an appropriate tool. The rated maximum output power B may be set in the device control unit 808. The device control unit 808 as will be described later.

The drive circuit 804 as a load is connected to the output side of each of the power supply units. Rated maximum power consumption $R_{max}$ is set in the drive circuit 804 in the embodiment. The rated maximum power consumption $R_{max}$ may be stored in a non-volatile memory provided in the drive circuit 804 with use of an appropriate tool. The rated maximum power consumption $R_{max}$ may be set in the device control unit 808.

As illustrated in FIG. 8, the drive circuit 804 may be constituted of a plurality of drive circuits 804a to 804n. When the drive circuit 804 is constituted as described above, rated maximum power consumption $R_{i\_max}$ is set of the drive circuits 804a to 804n. In this example, the drive circuit having the symbol i indicates the i-th drive circuit.

The device control unit 808 is communicatively connected to the power input unit 807 and to the drive circuit 804 to determine whether the power supply system according to the present embodiment is driven in a predetermined rated range, referring to the rated maximum output power B of the power input unit 807 and to the rated maximum power consumption $R_{max}$ of the drive circuit 804.

The device control unit 808 is also communicatively connected to a conversion function derivation unit 803a, and refers to an input-output conversion model derived by the conversion function derivation unit 803a. As well as the power supply control unit 103 in the first exemplary embodiment, an existing technique may be applied to the connection between these elements. The device control unit 808 may be constituted of dedicated hardware device. Alternatively, the device control unit 808 may be constituted of hardware such as a general-purpose CPU and a memory (both of which are not illustrated), and various software programs to be executed by the CPU.

Specific values of the rated maximum output power B, and of the rated maximum power consumption $R_{max}$ may be set in advance in the device control unit 808. A method for setting these values in the device control unit 808 may be such that storing these values in a non-volatile memory such as a flash memory mounted in the device control unit 808. In the above configuration, these values may be stored in the memory area with use of an appropriate tool at the time of manufacturing before shipment or at the time of maintenance after shipment or the like. When the device control unit 808 is constituted of hardware such as a general-purpose CPU and a memory, and a software program as described above, these values may be stored in the software program. That is, the the equations may be implemented in the software program.

Although not illustrated in FIG. 8, as well as in the third exemplary embodiment, the power supply control unit 803 identifies the number of power supply units included in the entire power supply system by referring to a number-of-power-supply detection signal. Other configuration in the embodiment is substantially the same as in the second and third exemplary embodiments.

Next, an operation in the embodiment is described.

The basic operation in the embodiment is substantially the same as in the first to third exemplary embodiments. Therefore, a portion different from the foregoing exemplary embodiments is mainly described. In particular, an operation of the conversion function derivation unit 803a, an optimal-output-power calculation unit 803b, and the device control unit 808 is described.

First of all, an operation of the conversion function derivation unit 803a is described. The conversion function derivation unit 803a derives the following Eq. (34) as an input-output conversion function, referring to the input-output conversion model set in each of the power supply units 801, and to the number N of power supply units. In Eq. (34), $x_i$, $y_i$, and $f_i$ respectively indicate an output power, an input power, and an input-output conversion model of the i-th power supply unit.

$$Y = \sum_{i=a}^{N} f_i(x_i) = f_1(x_1) + f_2(x_2) + f_3(x_3) + \ldots\ldots + f_N(x_N) \quad (34)$$

Assuming that the input-output conversion model of the i-th power supply unit is expressed by: $y_i = a_i x_i^2 + b_i x_i + c_i$, the following Eq. (35) is obtained from Eq. (34). As well as in the second exemplary embodiment, $a_i$, $b_i$, and $c_i$ of Eq. (34) are calculated from actual measured values of input-output characteristics that have been measured separately with respect to the i-th power supply unit 801i with use of a least-squares method, and are set in advance in the power supply unit.

$$Y = (a_1 x_1^2 + b_1 x_1 + c_1) + (a_2 x_2^2 + b_2 x_2 + c_2) + \ldots + (a_N x_N^2 + b_N x_N + c_N) \quad (35)$$

The conversion function derivation unit 803a notifies the input-output conversion function as expressed by Eq. (35) to the optimal-output-power calculation unit 803b to be described later by predetermined notification means. The notification means to the optimal-output-power calculation unit 803b may be substantially the same as in the second exemplary embodiment.

Next, an operation of the optimal-output-power calculation unit 803b is described. As well as in the second exemplary embodiment, the optimal-output-power calculation unit 803b refers to power consumption in the drive circuit 804 measured by the power meter 202, and to the input-output conversion function derived by the conversion function derivation unit 803a. Then, the optimal-output-power calculation unit 803b calculates an output power of each of the power supply units realizing minimum input power Y as expressed by Eq. (35), with use of the referred values.

Assuming that R is power consumption in the drive circuit 804 measured by the power meter 202, the following Eq. (36) is obtained from Eq. (2).

$$R = X = \sum_{i=1}^{N} x_i = x_1 + x_2 + \ldots x_N \quad (36)$$

Figure 9:
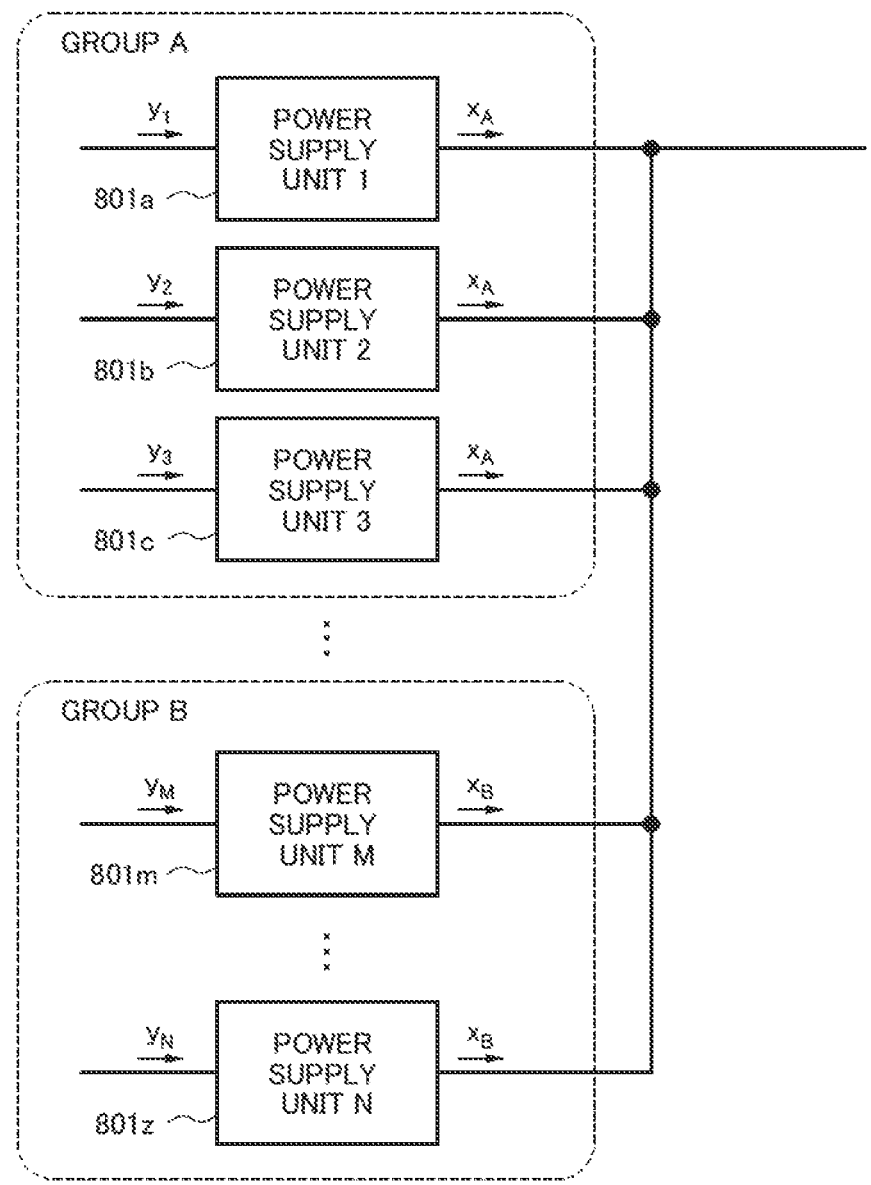
FIG. 9 is a schematic diagram when power supply units are divided into groups in the fourth exemplary embodiment of the present invention.

The optimal-output-power calculation unit 803b may derive a mathematical optimal solution regarding Y and each $x_i$ from Eqs. (35) and (36). This, however, may complicate the calculation. In the embodiment, in order to simplify the method for calculating Y and each $x_i$ by the optimal-output-power calculation unit 803b, as illustrated in FIG. 9, the power supply units are divided into two groups (hereinafter, called as group A and group B to simplify the description), and control is performed such that output powers of the power supply units included in each group are equal to each other.

When the calculation is simplified as described above, the following Eqs. (37) and (38) are obtained from Eqs. (35) and (36). In the following equations, $N_A$ and $N_B$ respectively indicate the number of power supply units included in group A or group B, and $N_A + N_B = N$. This includes a case in which all the power supply units are included in one group (e.g. the cases such that $N_A = 0$ and $N_B = N$). In addition, $x_A$ indicates an output power of each of the power supply units included in group A, and $x_B$ indicates an output power of each of the power supply units included in group B.

$$Y = (a_1 x_A^2 + b_1 x_A + c_1) + (a_2 x_A^2 + b_2 x_A + c_2) + \qquad (37)$$
$$\ldots (a_M x_B^2 + b_M x_B + c_M) + \ldots + (a_N x_B^2 + b_N x_B + c_N)$$

Next, an example of a processing for calculating $x_A$ and $x_B$ realizing a minimum input power with use of Eqs. (37) and (38) by the optimal-output-power calculation unit 803b is described with referring to FIG. 10A and FIG. 10B. Regarding Eqs. (37) and (38), output powers to be calculated are $x_A$ and $x_B$. Thus, the optimal-output-power calculation unit 803b is capable of calculating $x_A$ and $x_B$ realizing minimum input power Y by substantially the same calculation method as used in the second and third exemplary embodiments. Therefore, in the following description, the process of calculating specific value of $x_A$ and $x_B$ from Eqs. (37) and (38) is omitted.

First of all, the optimal-output-power calculation unit 803b selects the number of power supply units 801 to be operated. In this example, the number of power supply units to be operated is set to be n (in Step S1001). The optimal-output-power calculation unit 803b repeats the following processing, while changing the number n from n=1 to n=N.

Next, the optimal-output-power calculation unit 803b extracts all combinations of selecting n power supply units from the number N of power supply units (in Step S1002). In this example, the number of combinations is ${}_N C_n$. For example, when the power supply system includes four power supply units (N=4) i.e. the power supply unit 1, the power supply unit 2, the power supply unit 3, and the supply unit 4; and three power supply units (n=3) are operated among the four supply units, then, the number of combinations is ${}_4 C_3 = 4$. In this case, specific combinations to be extracted are (the power supply unit 1, the power supply unit 2, and the power supply unit 3), (the power supply unit 1, the power supply unit 2, and the power supply unit 4), (the power supply unit 1, the power supply unit 3, and the power supply unit 4), and (the power supply unit 2, the power supply unit 3, and the power supply unit 4). The optimal-output-power calculation unit 803b repeats the following processing for all the extracted combinations (in Step S1003).

Next, the optimal-output-power calculation unit 803b extracts all grouping patterns dividing the n power supply units selected in Step S1002 into two groups (in Step S1004). In this example, the number of grouping patterns dividing the power supply units into two groups is [n/2]+1. In the embodiment, the symbol "[ ]" indicates a floor function (a Gaussian symbol), and [n/2] indicates a maximal integer equal to n/2 or smaller. For example, when three power supply units are operated, the number of patterns dividing the three power supply units into two groups is [3/2]+1=2. In this case, the patterns to be extracted are (three power supply units, zero power supply unit), and (two power supply units, one supply unit). When four power supply units are operated, the number of grouping patterns is: [4/2]+1=3. In this case, the patterns to be extracted are (four power supply units, zero power supply unit), (three power supply units, one supply unit), and (two power supply units, two power supply units). The optimal-output-power calculation unit 803b repeats the following processing for all the extracted grouping patterns (in Step S1005).

Next, the optimal-output-power calculation unit 803b extracts all combinations allocating the power supply units to groups for all the grouping patterns extracted in Step S1004 (in Step S1006). When the power supply units are divided into two groups (m power supply units, (N−m) power supply units), the number of combinations of power supply units to be allocated to groups is maximally ${}_n C_m$. For example, the number of combinations dividing three power supply units (the power supply unit 1, the power supply unit 2, and the power supply unit 3) into two groups (two power supply units, one power supply unit) is ${}_3 C_2 = 3$. Specifically, {group A, group B}={(the power supply unit 1, the power supply unit 2), the power supply unit 3}, {(the power supply unit 1, the power supply unit 3), the power supply unit 2}, and {(the power supply unit 2, the power supply unit 3), the power supply unit 1}. In the following, in the embodiment, the symbol "{ }" indicates a pattern dividing the power supply units into two groups. When n is an even number, and m=n/2, the number of combinations is n!/(m!(n−m)!2!). In the embodiment, the symbol "!" indicates a factorial.

Next, the optimal-output-power calculation unit 803b calculates $x_A$ and $x_B$ realizing minimum input power Y from Eqs. (37) and (38) for all the patterns allocating the power supply units to two groups, which have been extracted in Step S1006. Then, the optimal-output-power calculation unit 803b records $x_A$, $x_B$, Y, and combination of power supply units realizing minimum input power Y at that time from the calculation results for all the patterns (Step S1007 to Step S1009). In Step S1008, the recorded data may be overwritten, each time $x_A$ and $x_B$ and combination of power supply units realizing minimum input power Y at that time are updated. As specific recording means, the optimal-output-power calculation unit 803b may temporarily store the above calculation result in a memory provided in the power supply control unit.

The optimal-output-power calculation unit 803b repeats the above calculation for all the combinations by changing the number n of power supply units to be operated (in Step S1001 to Step S1012) for all the combinations of n power supply units to be operated (in Step S1003 to Step S1011), and extracting all the combinations dividing the power supply units into two groups (in Step S1005 to Step S1010).

After the above calculation processing is finished, the optimal-output-power calculation unit 803b notifies the output power of each of the power supply units realizing minimum input power Y, which has been recorded in Step S1008, to a controller 803c (in Step S1013). The controller 803c, in response to receiving the notification from the optimal-output-power calculation unit 803b, controls the output power of each of the power supply units so that the output power of each of the power supply units coincides with the output power calculated by the optimal-output-power calculation unit 803b. The specific method for controlling the output power may be substantially the same as in the second exemplary embodiment of the present invention.

Figure 11:
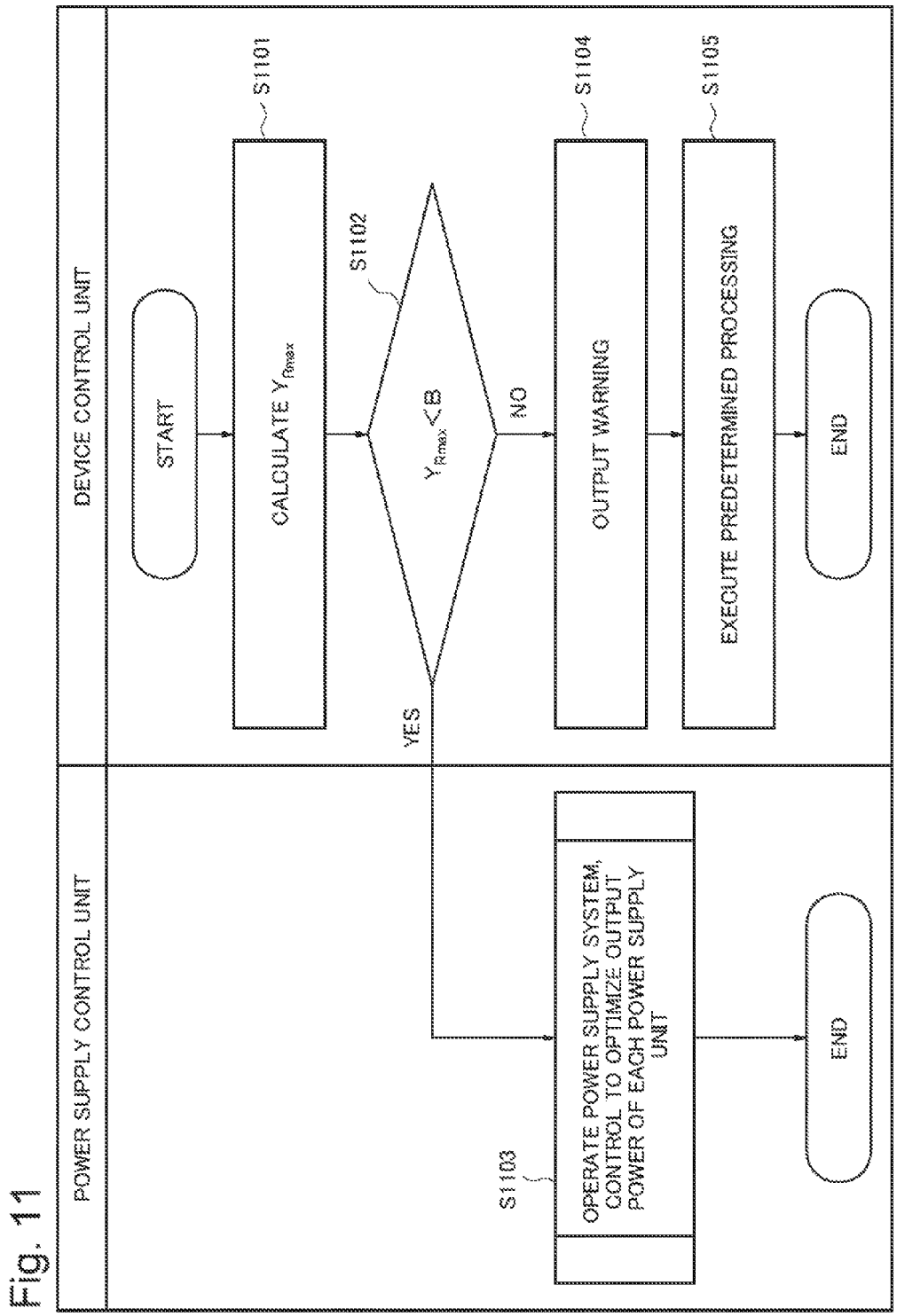
FIG. 11 is a flowchart illustrating a process of determining consistency between a rated maximum consumed power at a load to be described later and a rated maximum output power of a power input unit in the power supply system in the fourth exemplary embodiment of the present invention.

Next, an operation of the device control unit 808 is described with referring to FIG. 11. The device control unit 808 refers to the rated maximum power consumption $R_{max}$ of the drive circuit 804, and to the input-output conversion function derived by the conversion function derivation unit 803a. The device control unit 808 calculates a minimum value $Y_{Rmax}$ of input power to be obtained when power consumption of the drive circuit 804 coincides with $R_{max}$, with use of the referred values (in Step S101). The specific calculation method may be substantially the same as to the optimal-output-power calculation unit 803b.

The device control unit 808 may sum up the rated maximum power consumption set in the individual drive circuits to obtain the rated maximum power consumption Rmax=$\Sigma R_{i\_max}$, when the drive circuit 804 is constituted of a plurality of the drive circuits 804a to 804n.

Next, the device control unit 808 compares between the rated maximum output power B referred to by the power input unit 807, and $Y_{Rmax}$ (in Step S1102). When $Y_{Rmax}$<B (YES in Step S1102), the device control unit 808 controls to optimize the output power of each of the power supply units (in Step S1103). As described above, in Step S1103, the output voltage of each of the power supply units is controlled to realize a minimum input power in response to power consumption in the drive circuit 804.

When $Y_{Rmax}$≥B (NO in Step S1102), the device control unit 808 outputs a warning (in Step S1104). In a case that $Y_{Rmax}$≥B, the device control unit 808 may output the warning, and may executes a predetermined procedure to inhibit start of the power supply system and the like (in Step S1105). As a method for outputting a warning, the device control unit 808 may select an appropriate method in response to the specification required for the power supply system, such as displaying a warning on a display unit 809a constituted of a display or a warning lamp, generation of an alarm by an alarm unit 809b, or alert communication by a communication unit 809c.

By performing the above operation, the device control unit 808 is capable of determining consistency between the rated maximum output power B suppliable by the power input unit 807 as a power supply source and the rated maximum power consumption $R_{max}$ consumed in the drive circuit 804. Thus, the device control unit 808 is capable of checking whether the power supply system in the embodiment is operable without exceeding the predetermined rated range.

In the embodiment, the device control unit 808 is provided as an independent unit, but the present invention is not limited thereto. For example, the device control unit 808 may be integrally provided with the power supply control unit 803, or may be implemented as one of the functions of the optimal-output-power calculation unit 803b or of the controller 803c.

According to the power supply system of the present embodiment as described above, a plurality of the power supply units 801 are divided into two groups, and the power supply units 801 included in each group are controlled so that the output powers of the power supply units 801 are equal to each other. Thus, the power supply system according to the present embodiment is capable of simplifying the processing of calculating an output power with respect to each of the power supply units 801. Further, the power supply system according to the present embodiment is capable of quickly controlling the output power of each of the power supply units 801 in response to load variation.

Further, the power supply system according to the present embodiment is capable of determining consistency between the rated maximum output power B suppliable by the power input unit 807 as a power supply source and the rated maximum power consumption $R_{max}$ consumed in the drive circuit 804. Thus, the power supply system according to the present embodiment is capable of checking whether the power supply system is operable without exceeding the rated range by the system itself.

<Fifth Exemplary Embodiment>

Next, the fifth exemplary embodiment of the present invention is described. The fifth exemplary embodiment of the present invention has substantially the same configuration as the fourth exemplary embodiment except for the operation of the optimal-output-power calculation unit 803b.

In the following, the operation of the optimal-output power calculation unit 803b in the embodiment is described.

In the fourth exemplary embodiment, the optimal-output-power calculation unit 803b calculates an output power of each of the power supply units realizing minimum input power Y among all the patterns dividing the power supply units into two groups (Step S1004 to Step S010 illustrated in FIG. 10A and FIG. 10B).

In the embodiment, the calculation process of the optimal-output-power calculation unit 803b is further simplified. Specifically, the optimal-output-power calculation unit 803b in the embodiment calculates an output power of each of the power supply units realizing minimum input power Y by dividing n power supply units into two groups, such like {(n−1) power supply units, one power supply unit}, (where n is a positive integer of 2 or larger).

In the following, an example in which the number of power supply units is three, is described.

It is assumed that the three power supply units are the power supply unit 1, the power supply unit 2, and the power supply unit 3; and the quadratic functions as expressed by the following equations are set to each of power supply units as an input-output conversion model.

power supply unit 1: $y_1 = f_1(x_1) = a_1 x_1^2 + b_1 x_1 + c_1$ (39)

power supply unit 2: $y_2 = f_2(x_2) = a_2 x_2^2 + b_2 x_2 + c_2$ (40)

power supply unit 3: $y_3 = f_3(x_3) + a_3 x_3^2 + b_3 x_3 + c_3$ (41)

input power Y: $Y = y_1 + y_2 + y_3$

First, a case, in which two power supply units are operated, is described below.

When two power supply units are operated, the two power supply units are selected from among the power supply unit 1 to the power supply unit 3. In this case, there are three patterns of combinations of power supply units to be operated i.e. (the power supply unit 1, the power supply unit 2), (the power supply unit 1, the power supply unit 3), and (the power supply unit 2, the power supply unit 3).

When two power supply units are divided into two groups {one power supply unit, one power supply unit}, the optimal-output-power calculation unit 803b calculates an output power of each of the power supply units realizing minimum input power Y for each of the above three patterns of combinations of power supply units to be operated. In this case, the number of power supply units to be operated is two. Therefore, it is possible to calculate an output power of each of the power supply units by substantially the same calculation method as applied in the second exemplary embodiment. As described in the second exemplary embodiment, the calculation result includes a case, in which only one power supply unit is operated out of the two supply units. The calculation result also includes a case, in which output powers of the two power supply units are equal to each other.

Next, there is described a case, in which three power supply units are operated. When three power supply units are operated, all the power supply unit 1 to the power supply unit 3 are operated. Therefore, there is only pattern of combination of power supply units to be operated i.e. (the power supply unit 1, the power supply unit 2, and the power supply unit 3).

When the three power supply units are divided into two groups (two power supply units, one power supply unit), the grouping patterns are the following three patterns i.e. {(the power supply unit 1, the power supply unit 2), the power supply unit 3}, {(the power supply unit 1, the power supply unit 3), the power supply unit 2}, and {(the power supply unit 2, the power supply unit 3), the power supply unit 1}.

In this example, a grouping pattern {(the power supply unit 1, the power supply unit 2), the power supply unit 3] is described. The following Eqs. (42) and (43) are obtained, assuming that output powers of the power supply unit 1 and the power supply unit 2 are equal to each other ($x_1=x_2$).

$$Y=\{(a_1+a_2)x_1^2+(b_1+b_2)x_1+(c_1+c_2)\}+(a_3x_3^2+b_3x_3+c_3) \quad (42)$$

$$R=x_1+x_1+x_3=2x_1+x_3 \quad (43)$$

Eqs. (42) and (43) respectively correspond to Eqs. (9) and (10) in the second exemplary embodiment. Therefore, the optimal-output-power calculation unit 803b is capable of calculating $x_1$ and $x_3$ realizing minimum input power Y by substantially the same processing as in the second exemplary embodiment. The optimal-output-power calculation unit 803b is capable of calculating an output power of each of the power supply units realizing minimum input power Y for the remaining two grouping patterns, as well as the above grouping pattern.

Next, the optimal-output-power calculation unit 803b selects an output power of each of the power supply units realizing minimum input power Y from all the calculation results to be obtained when two power supply units are operated, and when three power supply units are operated as described above.

Then, the optimal-output-power calculation unit 803b notifies a controller 803c of the selected output powers.

The operation of the other constituent elements in the embodiment is substantially the same as in the fourth exemplary embodiment, and therefore, description thereof is omitted.

According to the power supply system of the present embodiment as described above, the optimal-output-power calculation unit 803b is capable of simplifying the processing of calculating an output power with respect to each of the power supply units by limiting the grouping pattern of power supply units.

The power supply system in the embodiment is advantageous in quickly controlling the output power of each of the power supply units in response to load variation, because the processing of calculating an output power is further simplified, as compared with the fourth exemplary embodiment. The power supply system according to the present embodiment is applicable to a configuration constituted of a plurality of main power supply units having a large rated output power capacity, and one auxiliary power supply unit having a small rated output power capacity and configured to supply small electric power.

The present invention described by the aforementioned exemplary embodiments may be configured such that the processing to be executed by the power supply control unit 803 or by the device control unit 808 is implemented by hardware constituted of a general-purpose CPU and a memory (both of which are not illustrated), and various software programs to be executed by the CPU.

Specifically, the present invention is implementable by supplying a software program capable of implementing a processing in the power supply control unit or in the device control unit described in the foregoing exemplary embodiments, to a device constituted of a general-purpose hardware as described above, and then allowing a CPU in the device to read the software program for execution.

The computer program supplied to the device may be stored in a temporary memory such as a readable-and-writable DRAM (Dynamic Random Access Memory), or in a non-volatile storage device such as a flash memory.

In the above configuration, the method for supplying a computer program to each of the devices may be a currently available method such as a method of installing the computer program in the device with use of an appropriate tool at the time of manufacturing before shipment or at the time of maintenance after shipment or the like, or a method of downloading the computer program from the outside via a communication line such as the Internet.

In the above configuration, the present invention may be construed as codes configuring the computer program, or as a computer-readable storage medium in which the codes are recorded.

In the present invention described by the foregoing exemplary embodiments, an input-output conversion model of each of the power supply units may be set in the power supply control unit. When an input-output conversion model is known in advance with respect to each of the power supply units to be connected to the power supply control unit, setting the input-output conversion model of each of the power supply units in the power supply control unit makes it possible to calculate an optimal output power of each of the power supply units. The method for setting the input-output conversion model in the power supply control unit may be such that mounting a non-volatile memory such as a flash memory in the power supply control unit, and storing the input-output conversion model in the memory area with use of an appropriate tool at the time of manufacturing before shipment or at the time of maintenance after shipment or the like.

When the power supply control unit is constituted of hardware such as a general-purpose CPU and a memory, and a software program as described above, the input-output conversion model may be stored in the software program. That is, the the equations may be implemented in the software program.

The input-output conversion model of each of the power supply units may exist on the outside of the power supply system. In this case, the power supply control unit is capable of calculating an optimal output power of each of the power supply units by referring to the input-output conversion model existing on the outside. An example of the above case is an environment, in which the power supply system is connected to a communication network. For example, a specific server on the communication network may hold an input-output conversion model of the power supply system, and the power supply control unit may refer to the input-output conversion model by connecting to the server via a communication path.

As described above, the present invention has been described by the exemplary embodiments. The technical scope of the present invention, however, is not limited to the range described in the foregoing embodiments. It is obvious to a person skilled in the art to add a variety of modifications or improvements to the embodiments. In the above case, such a modified or improved embodiment may be included in the technical scope of the present invention. This is obvious from the matters described in the claims.

Part or all of the exemplary embodiments and the modifications thereof may be described as the following Supplemental Notes. The present invention exemplarily described by the embodiments and the modifications thereof, however, is not limited to the following.

(Supplemental Note 1)

A power supply system including:

a plurality of power supply units that convert an input power into an output power and supply the output power to a load;

a power measurement unit, which is connected between an output side of the power supply units and the load, that measures the output power output from the power supply units; and a power supply control unit that calculates an optimal output power realizing a minimum input power to the power supply units in accordance with the output power measured by the power measurement unit, and controls the power supply units based on the calculated optimal output power.

(Supplemental Note 2)

The power supply system according to Supplemental Note 1, wherein the power supply control unit calculates the input power to the power supply units in accordance with the output power measured by the power measurement unit, based on an input-output conversion model expressing power conversion between input power to the power supply units and output power to be output from the power supply units.

(Supplemental Note 3)

The power supply system according to Supplemental Note 2, wherein the input-output conversion model is a quadratic function of the output power of the power supply unit.

(Supplemental Note 4)

The power supply system according to any one of Supplemental Notes 2 to 3, wherein the power measurement unit measures a sum of output powers of the plurality of power supply units to be consumed in the load, and the power supply control unit calculates the optimal output power realizing a minimum sum of input powers to the plurality of power supply units, based on the sum of the output powers measured by the power measurement unit, and the input-output conversion model with respect to each of the power supply units, and adjusts the output power of each of the power supply units, based on the calculated optimal output power.

(Supplemental Note 5)

The power supply system according to Supplemental Note 4, wherein in a condition that it is assumed that output powers of one or more specific power supply units included in the plurality of power supply units are equal to each other, and output powers of remaining power supply units are equal to each other, the power supply control unit calculates the optimal output power, for the each power supply unit, that realizes the minimum sum of input powers to the plurality of power supply units, and adjusts the output power of each of the power supply units, based on the calculated optimal output power.

(Supplemental Note 6)

The power supply system according to any one of Supplemental Notes 2 to 5, further including:

a power input unit, which a rated maximum output power is set, connected to an input side of the power supply units;

a drive circuit unit connected to the output side of the power supply units, the drive circuit unit being a load for which a rated maximum power consumption is set; and a device control unit, wherein the device control unit calculates the minimum sum of input power to the plurality of power supply units, by assuming that the rated maximum power consumption is consumed in the load, and compares between the calculated minimum sum of input power and the rated maximum output power of the power input unit.

(Supplemental Note 7)

The power supply system according to any one of Supplemental Notes 1 to 6, wherein the power supply control unit controls the output power of the power supply units by adjusting the output voltage ratio of the power supply units.

(Supplemental Note 8)

The power supply system according to any one of Supplemental Notes 1 to 7, further including:

a battery unit on the output side of the power supply unit, (Supplemental Note 9)

The power supply system according to any one of Supplemental Notes 1 to 8, wherein the input-output conversion model is set in the power supply unit.

(Supplemental Note 10)

The power supply system according to any one of Supplemental Notes 1 to 9, wherein the input-output conversion model is set in the power supply control unit.

(Supplemental Note 11)

A control method for a power supply system including:

measuring output powers output from a plurality of power supply units that convert an input power into the output powers and supply the output powers to a load;

calculating an optimal output power for the power supply units realizing a minimum input power to the power supply units in accordance with the measured output powers; and controlling the power supply units based on the calculated optimal output power.

(Supplemental Note 12)

The control method for a power supply system according to Supplemental Note 11, further including:

calculating an input power to the power supply units in accordance with the measured output powers, based on an input-output conversion model expressing power conversion between input power to the power supply units and output power to be output from the power supply units.

(Supplemental Note 13)

The control method for a power supply system according to Supplemental Note 12, wherein the input-output conversion model is a quadratic function of the output power of the power supply unit.

(Supplemental Note 14)

The control method for a power supply system according to any one of Supplemental Notes 12 to 13, further including:

calculating an optimal output power realizing a minimum sum of input powers to the plurality of power supply units, based on the sum of the output powers of the plurality of power supply units consumed in the load, and the input-output conversion model with respect to each of the power supply units; and adjusting the output power of each of the power supply units, based on the calculated optimal output power.

(Supplemental Note 15)

The control method for a power supply system according to Supplemental Note 14, further including:

assuming that output powers of one or more specific power supply units included in the plurality of power supply units are equal to each other, and output powers of remaining power supply units are equal to each other, calculating the optimal output power, of each of the power supply units, that realizes the minimum sum of input powers to the plurality of power supply units; and adjusting the output power of each of the power supply units, based on the calculated optimal output power.

(Supplemental Note 16)

The control method for a power supply system according to any one of Supplemental Notes 11 to 15, further including:

referring to a rated maximum output power of a power input unit connected to an input side of the power supply units, and a rated maximum power consumption at a load connected to an output side of the power supply unit;

calculating the minimum sum of input power to the plurality of power supply units, assuming that the rated maximum power consumption is consumed in the load; and comparing between the calculated minimum sum of input power and the rated maximum output power.

(Supplemental Note 17)

The control method for a power supply system according to any one of Supplemental Notes 11 to 16, further including:

controlling the output power of the power supply units by adjusting the output voltage ratio of the power supply units.

(Supplemental Note 18)

A non-transitory computer-readable storage medium recorded with a control program that controls an operation of a power supply system, the control program causing a computer to execute:

a process of acquiring a measurement result of output powers output from a plurality of power supply units;

a process of calculating an optimal output power realizing a minimum input power to be input to the power supply unit in accordance with the measurement result of output powers; and a process of controlling the output powers of the power supply unit based on the calculated optimal output power.

(Supplemental Note 19)

The non-transitory computer-readable storage medium recorded with the control program according to Supplemental Note 18, wherein the control program causes the computer to execute:

a process of calculating an input power to the power supply units in accordance with the output powers measured by a power measurement unit, based on an input-output conversion model expressing power conversion between input power to the power supply units and output power to be output from the power supply units;

a process of calculating the optimal output power realizing the minimum calculated input power; and a process of controlling the output power of the power supply units, based on the calculated optimal output power.

(Supplemental Note 20)

The non-transitory computer-readable storage medium recorded with the control program according to Supplemental Note 19, wherein the input-output conversion model is a quadratic function of the output power of the power supply unit.

(Supplemental Note 21)

The non-transitory computer-readable storage medium recorded with the control program according to any one of Supplemental Notes 19 to 20, wherein the control program causes the computer to execute:

a process of calculating an optimal output power realizing a minimum sum of input powers to the plurality of power supply units, based on a sum of the output powers of the plurality of power supply units consumed in a load, and the input-output conversion model with respect to each of the power supply units, and a process of adjusting the output power of each of the power supply units, based on the calculated optimal output power.

(Supplemental Note 22)

The non-transitory computer-readable storage medium recorded with the control program according to Supplemental Note 21, wherein assuming that output powers of one or more specific power supply units included in the plurality of power supply units are equal to each other, and output powers of remaining power supply units are equal to each other, the computer causes the control program to execute:

a process of calculating the optimal output power realizing the minimum sum of input powers to the plurality of power supply units with respect to each of the power supply units, and a process of adjusting the output power of each of the power supply units, based on the calculated optimal output power.

(Supplemental Note 23)

The non-transitory computer-readable storage medium recorded with the control program of the power supply system according to any one of Supplemental Notes 18 to 22, wherein the computer causes the control program to execute:

a process of referring to a rated maximum output power of a power input unit connected to an input side of the power supply units, and a rated maximum power consumption at a load connected to the output side of the power supply units:

a process of calculating the minimum sum of input power to the plurality of power supply units, assuming that the rated maximum power consumption is consumed in the load; and a process of comparing between the calculated minimum sum of input power and the rated maximum output power.

(Supplemental Note 24)

The non-transitory computer-readable storage medium recoded with the control program of the power supply system according to any one of Supplemental Notes 18 to 23, wherein the computer causes the control program to execute:

a process of controlling the output power of the power supply units by adjusting the output voltage ratio of the power supply units.

INDUSTRIAL APPLICABILITY

The present invention is applicable to a power supply system including a plurality of power supply units. In particular, according to the present invention, it is possible to adjust the output power of each of the power supply units realizing optimal conversion efficiency between input power and output power.

Therefore, the present invention is applicable to a redundant power supply system in which a plurality of power supply apparatuses are connected in parallel. The present invention is also applicable to power supply system for combination of a power supply circuit for a large load and a power supply apparatus using a standby power supply circuit.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A power supply system comprising:
   a plurality of power supply units that convert an input power into an output power and supply the output power to a load;
   a power measurement unit, which is connected between an output side of the power supply units and the load, that measures the output power output from the power supply units; and
   a power supply control unit that calculates an optimal output power realizing a minimum input power to the power supply units in accordance with the output power measured by the power measurement unit, and controls the power supply units based on the calculated optimal output power, wherein
   the power supply control unit calculates the input power to the power supply units in accordance with the output power measured by the power measurement unit, based on an input-output conversion model expressing power conversion between input power to the power supply units and output power to be output from the power supply units,
   the power measurement unit measures a sum of output powers of the power supply units to be consumed in the load,
   the power supply control unit calculates an optimal output power realizing a minimum sum of input powers to the power supply units, based on the sum of the output powers measured by the power measurement unit, and the input-output conversion model with respect to each of the power supply units, and adjusts the output power of each of the power supply units, based on the calculated optimal output power,
   in a condition that it is assumed that output powers of one or more specific power supply units included in the plurality of power supply units are equal to each other, and output powers of remaining power supply units are equal to each other, and
   the power supply control unit calculates the optimal output power, for each power supply unit, that realizes the minimum sum of input powers to the power supply units, and adjusts the output power of each of the power supply units, based on the calculated optimal output power.

2. The power supply system according to claim 1, wherein the input-output conversion model is a quadratic function of the output power of the power supply unit.

3. The power supply system according to claim 1, further comprising:
   a power input unit, which a rated maximum output power is set, connected to an input side of the power supply units;
   a drive circuit unit connected to the output side of the power supply units, the drive circuit unit being a load for which a rated maximum power consumption is set; and
   a device control unit, wherein
   the device control unit calculates the minimum sum of input power to the plurality of power supply units, by assuming that the rated maximum power consumption is consumed in the load, and compares between the calculated minimum sum of input power, and the rated maximum output power of the power input unit.

4. The power supply system according to claim 1, wherein the power supply control unit controls the output power of the power supply units by adjusting output voltages of the plurality of power supply units.

5. The power supply system according to claim 1, further comprising:
   a battery unit on the output side of the power supply units.

6. A control method for a power supply system, comprising:
   measuring output powers output from a plurality of power supply units that convert an input power into the output powers and supply the output powers to a load;
   calculating an optimal output power for the power supply units realizing a minimum input power to the power supply units in accordance with the measured output powers;
   controlling the power supply units based on the calculated optimal output power;
   calculating the input power to the power supply units in accordance with the output power, based on an input-output conversion model expressing power conversion between input power to the power supply units and output power to be output from the power supply units;
   measuring a sum of output powers of the power supply units to be consumed in the load;
   calculating an optimal output power realizing a minimum sum of input powers to the power supply units, based on the sum of the output powers and the input-output conversion model with respect to each of the power supply units, and adjusting the output power of each of the power supply units based on the calculated optimal output power;
   in a condition that it is assumed that output powers of one or more specific power supply units included in the plurality of power supply units are equal to each other, and output powers of remaining power supply units are equal to each other; and
   calculating the optimal output power for each power supply unit, that realizes the minimum sum of input powers to the power supply units, and adjusting the output power of each power supply unit, based on the calculated optimal output power.

7. A non-transitory computer-readable storage medium recorded with a control program that controls an operation of a power supply system, the control program causing a computer to execute:
   a process of acquiring a measurement result of output powers output from a plurality of power supply units;
   a process of calculating an optimal output power realizing a minimum input power to be input to the power supply unit in accordance with the measurement result of output powers;

a process of controlling the output powers of the power supply units based on the calculated optimal output power;

a process of calculating the input power to the power supply units in accordance with the output power, based on an input-output conversion model expressing power conversion between input power to the power supply units and output power to be output from the power supply units;

a process of measuring a sum of output powers of the power supply units to be consumed in the load;

a process of calculating an optimal output power realizing a minimum sum of input powers to the power supply units, based on the sum of the output powers and the input-output conversion model with respect to each of the power supply units, and adjusting the output power of each of the power supply units based on the calculated optimal output power;

in a condition that it is assumed that output powers of one or more specific power supply units included in the plurality of power supply units are equal to each other, and output powers of remaining power supply units are equal to each other; and a process of calculating the optimal output power for each power supply unit, that realizes the minimum sum of input powers to the power supply units, and adjusting the output power of each power supply unit, based on the calculated optimal output power.

* * * * *